(12) United States Patent
Park et al.

(10) Patent No.: US 9,450,719 B2
(45) Date of Patent: Sep. 20, 2016

(54) METHOD AND APPARATUS FOR TRANSMITTING OR RECEIVING DOWNLINK SIGNAL

(71) Applicant: LG ELECTRONICS INC., Seoul (KR)

(72) Inventors: Hanjun Park, Anyang-si (KR); Hakseong Kim, Anyang-si (KR); Hanbyul Seo, Anyang-si (KR); Jonghyun Park, Anyang-si (KR); Kijun Kim, Anyang-si (KR); Suckchel Yang, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 27 days.

(21) Appl. No.: 14/380,344

(22) PCT Filed: Mar. 5, 2013

(86) PCT No.: PCT/KR2013/001771
§ 371 (c)(1),
(2) Date: Aug. 21, 2014

(87) PCT Pub. No.: WO2013/133608
PCT Pub. Date: Sep. 12, 2013

(65) Prior Publication Data
US 2015/0063234 A1    Mar. 5, 2015

Related U.S. Application Data

(60) Provisional application No. 61/606,945, filed on Mar. 5, 2012, provisional application No. 61/610,995, filed on Mar. 14, 2012, provisional application No. 61/641,273, filed on May 1, 2012, provisional application No. 61/679,063, filed on Aug. 2, 2012.

(51) Int. Cl.
*H04B 7/02* (2006.01)
*H04L 5/00* (2006.01)
*H04W 72/04* (2009.01)

(52) U.S. Cl.
CPC ............ *H04L 5/0035* (2013.01); *H04B 7/024* (2013.01); *H04L 5/0048* (2013.01); *H04L 5/0053* (2013.01); *H04W 72/042* (2013.01)

(58) Field of Classification Search
CPC ............ H04W 72/04; H04W 72/042; H04W 72/0406; H04J 99/00; H04B 7/024; H04L 5/0035; H04L 5/00; H04L 5/001; H04L 5/0094; H04L 5/0053; H04L 5/0037; H04L 5/0039; H04L 5/0041; H04L 5/0055; H04L 5/005; H04L 5/0051
See application file for complete search history.

(56) References Cited

U.S. PATENT DOCUMENTS 8,983,479 B2 * 3/2015 Ko ................... H04B 7/024
                                                    375/219
9,014,138 B2 * 4/2015 Fong ................ H04B 7/024
                                                    370/331

(Continued)

FOREIGN PATENT DOCUMENTS

WO       2010/081166        7/2010

OTHER PUBLICATIONS

NEC Group, "E-PDCCH design aspects related to reference signals," 3GPP TSG RAN WG1 Meeting #68, R1-120254, Feb. 2012, 3 pages.

(Continued)

*Primary Examiner* — Jae Y Lee
*Assistant Examiner* — Aixa Guadalupe-Cruz
(74) *Attorney, Agent, or Firm* — Lee, Hong, Degerman, Kang & Walmey; Jonathan Kang; Michael Monaco

(57) ABSTRACT

Provided is a method for receiving a downlink signal by a user equipment (UE) in a wireless communication system supporting Coordinated Multi-point transmission and reception includes: receiving a list of candidate seeds for generating a sequence of a downlink demodulation reference signal (DM-RS) and downlink control information, and detecting the DCI; if a format of the detected DCI corresponds to a unique operation of a transmission mode configured to the UE, generating a sequence of the downlink DM-RS using one seed value selected from among the list of the candidate seeds on the basis of specific information included in the DCI; and if a format of the detected DCI corresponds to a fall-back operation of the transmission mode, generating a sequence of the downlink DM-RS using a specific seed value selected from among the list of the candidate seeds or an identifier (ID) of a serving cell.

16 Claims, 6 Drawing Sheets

(56) References Cited

U.S. PATENT DOCUMENTS

2012/0176884 A1* 7/2012 Zhang ............... H04B 7/024
370/203
2012/0294694 A1* 11/2012 Garot ............... F27D 1/141
411/427

OTHER PUBLICATIONS

Samsung, "Scrambling sequence for CoMP," 3GPP TSG RAN WG1 meeting #60, R1-101178, Feb. 2010, 3 pages.
Pantech, "Discussion on demodulation RS for DL MIMO enhancements in Rel-11," 3GPP TSG RAN WG1 Meeting #66, R1-112287, Aug. 2011, 2 pages.
Panasonic, "DCI format and blind decoding for LTE-Advanced," 3GPP TSG-RAN WG1 Meeting #59, R1-094497, Nov. 2009, 5 pages.
PCT International Application No. PCT/KR2013/001771, Written Opinion of the International Searching Authority dated Jun. 25, 2013, 1 page.

* cited by examiner (a)          (b)

METHOD AND APPARATUS FOR TRANSMITTING OR RECEIVING DOWNLINK SIGNAL

CROSS-REFERENCE TO RELATED APPLICATIONS

This application is the National Stage filing under 35 U.S.C. 371 of International Application No. PCT/KR2013/001771, filed on Mar. 5, 2013, which claims the benefit of U.S. Provisional Application Ser. No. 61/606,945, filed on Mar. 5, 2012, 61/610,995, filed on Mar. 14, 2012, 61/641,273, filed on May 1, 2012 and 61/679,063, filed on Aug. 2, 2012, the contents of which are all hereby incorporated by reference herein in their entirety.

TECHNICAL FIELD

The present invention relates to a wireless communication system, and more particularly to a method and apparatus for transmitting and receiving a downlink signal.

BACKGROUND ART

Recently, since various devices requiring machine-to-machine (M2M) communication and high data transfer rate, such as smartphones or tablet personal computers (PCs), have appeared and come into widespread use. This rapidly increases the quantity of data which needs to be processed in a cellular network. In order to satisfy the rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been spotlighted. In addition, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has data throughput much higher than that of the legacy communication scheme in which each node operates as an independent base station (BS) to communicate with the UE without cooperation.

A multi-node system performs coordinated communication using a plurality of nodes, each of which operates as a base station or an access point, an antenna, an antenna group, a radio remote header (RRH), and a radio remote unit (RRU). Unlike the conventional centralized antenna system in which antennas are concentrated on a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-mode system can be considered as a kind of Multiple Input Multiple Output (MIMO) system since dispersed nodes can communicate with a single UE or multiple UEs by transmitting/receiving different data streams simultaneously. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to result in a decrease in pathloss and to enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communications with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

DISCLOSURE OF INVENTION

Technical Problem

An object of the present invention is to provide a method and apparatus for efficiently transmitting and receiving a downlink signal.

It is to be understood that technical objects to be achieved by the present invention are not limited to the aforementioned technical objects and other technical objects which are not mentioned herein will be apparent from the following description to one of ordinary skill in the art to which the present invention pertains.

Solution to Problem

The object of the present invention can be achieved by providing a method for receiving a downlink signal by a user equipment (UE) in a wireless communication system supporting Coordinated Multi-point transmission and reception (CoMP), the method comprising: receiving a list of candidate seeds for generating a sequence of a downlink demodulation reference signal (DM-RS) and downlink control information, and detecting the downlink control information; if a format of the detected downlink control information corresponds to a unique operation of a transmission mode configured to the UE, generating a sequence of the downlink DM-RS using one seed value selected from among the list of the candidate seeds on the basis of specific information included in the downlink control information; and if a format of the detected downlink control information corresponds to a fall-back operation of the transmission mode, generating a sequence of the downlink DM-RS using a specific seed value selected from among the list of the candidate seeds or an identifier (ID) of a serving cell.

If the format of the detected downlink control information corresponds to the fall-back operation of the transmission mode, the downlink control information may include a downlink grant for a multicast broadcast single frequency network (MBSFN) subframe.

The one seed value selected from among the list of the candidate seeds may be an identifier (ID) of a neighbor cell.

Additional information other than the specific information included in the downlink control information may be used to select the seed value.

The list of the candidate seeds for generating a sequence of the downlink DM-RS is differently established according to indexes of a downlink subframe, and the list of the candidate seeds allocated to each index of the downlink subframe may be a subset of a basic list of the candidate seeds.

The list of the candidate seeds for generating a sequence of the downlink DM-RS may be differently established according to an identifier of a hybrid automatic repeat request (HARQ) process, and the list of the candidate seeds allocated to each identifier of the HARQ process may be a subset of a basic list of the candidate seeds.

The downlink control information may be detected in a UE-specific search space of a control region of downlink subframe.

In another aspect of the present invention, a method for transmitting a downlink signal by a base station (BS) in a wireless communication system supporting Coordinated Multi-point transmission and reception (CoMP) includes: transmitting a list of candidate seeds for generating a sequence of a downlink demodulation reference signal (DM-RS) and downlink control information to a user equipment (UE); if a format of the detected downlink control information corresponds to a unique operation of a transmission mode configured to the UE, the UE is configured to generate a sequence of the downlink DM-RS using one seed value selected from among the list of the candidate seeds on the basis of specific information contained in the downlink control information; and if a format of the detected downlink control information corresponds to a fall-back operation of the transmission mode, the UE is configured to generate a sequence of the downlink DM-RS using a specific seed value selected from among the list of the candidate seeds or an identifier (ID) of a serving cell.

In another aspect of the present invention, a user equipment (UE) for receiving a downlink signal (UE) in a wireless communication system supporting Coordinated Multi-point transmission and reception (CoMP) includes: a radio frequency (RF) unit; and a processor configured to control the RF unit, wherein the processor is configured to receive a list of candidate seeds for generating a sequence of a downlink demodulation reference signal (DM-RS) and downlink control information, and detect the downlink control information, and wherein, if a format of the detected downlink control information corresponds to a unique operation of a transmission mode configured to the UE, the processor is configured to generate a sequence of the downlink DM-RS using one seed value selected from among the list of the candidate seeds on the basis of specific information contained in the downlink control information; and if a format of the detected downlink control information corresponds to a fall-back operation of the transmission mode, the processor is configured to generate a sequence of the downlink DM-RS using a specific seed value selected from among the list of the candidate seeds or an identifier (ID) of a serving cell.

If the format of the detected downlink control information may correspond to the fall-back operation of the transmission mode, the downlink control information may include a downlink grant for a multicast broadcast single frequency network (MBSFN) subframe.

The one seed value selected from among the candidate seed list may be an identifier (ID) of a neighbor cell.

Additional information other than the specific information included in the downlink control information may be used to select the seed value.

The list of the candidate seeds for generating a sequence of the downlink DM-RS may be differently established according to indexes of a downlink subframe, and the list of the candidate seeds allocated to each index of the downlink subframe may be a subset of a basic list of the candidate seeds.

The list of the candidate seeds for generating a sequence of the downlink DM-RS may be differently established according to an identifier of a hybrid automatic repeat request (HARQ) process, and the list of the candidate seeds allocated to each identifier of the HARQ process may be a subset of a basic list of the candidate seeds.

The downlink control information may be detected in a UE-specific search space of a control region of downlink subframe.

In another aspect of the present invention, a base station (BS) for transmitting a downlink signal in a wireless communication system supporting Coordinated Multi-point transmission and reception (CoMP) includes: a radio frequency (RF) unit; and a processor configured to control the RF unit, wherein the processor transmits a list of candidate seeds for generating a sequence of a downlink (DL) demodulation reference signal (DM-RS) and downlink control information to a user equipment (UE), wherein, if a format of the detected downlink control information corresponds to a unique operation of a transmission mode configured to the UE, the user equipment (UE) is configured to generate a sequence of the downlink DM-RS using one seed value selected from among the list of the candidate seeds on the basis of specific information included in the downlink control information; and if a format of the detected downlink control information corresponds to a fall-back operation of the transmission mode, the UE generates a sequence of the downlink DM-RS using a specific seed value selected from among the list of the candidate seeds or an identifier (ID) of a serving cell.

It is to be understood that both the foregoing general description and the following detailed description of the present invention are exemplary and explanatory and are intended to provide further explanation of the invention as claimed.

Advantageous Effects of Invention

As is apparent from the above description, exemplary embodiments of the present invention can efficiently receive downlink signals, and can efficiently generate a sequence for a reference signal (RS).

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF DRAWINGS

The accompanying drawings, which are included to provide a further understanding of the invention, illustrate embodiments of the invention and together with the description serve to explain the principle of the invention.

MODE FOR THE INVENTION

Figure 1:
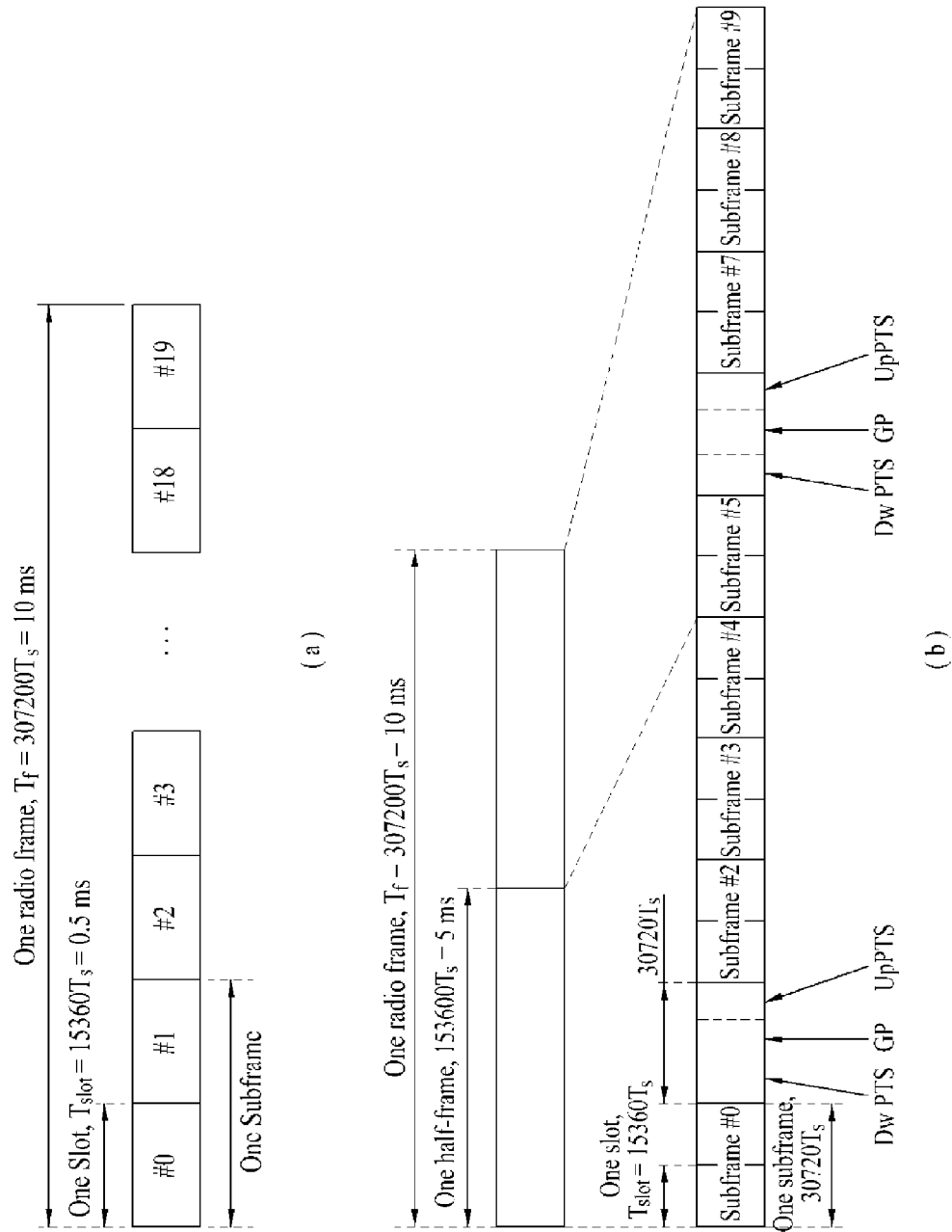
FIG. 1 exemplarily shows a radio frame structure for use in a wireless communication system.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

In some cases, in order to prevent ambiguity of the concepts of the present invention, conventional devices or apparatuses well known to those skilled in the art will be omitted and be denoted in the form of a block diagram on the basis of important functions of the present invention. Wherever possible, the same reference numbers will be used throughout the drawings to refer to the same or like parts.

In the following description, a user equipment (UE) may be a fixed or mobile user equipment (UE), and may be any one of various devices that transmit and receive user data and/or various kinds of control information by communicating with a base station (BS). The UE may be referred to as a Terminal Equipment, Mobile Station (MS), Mobile Terminal (MT), User Terminal (UT), Subscriber Station (SS), wireless device, Personal Digital Assistant (PDA), wireless modem, or handheld device. In the following description, a Base Station (BS) is a fixed station that generally communicates with a UE or another BS. The BS communicates with a UE or another BS to exchange various kinds of data and control information with a UE or another BS. The BS may be referred to as an Advanced Base Station (ABS), Node-B (NB), evolved-NodeB (eNB), Base Transceiver System (BTS), Access Point (AP), or Processing Server (PS). In the following description, the term BS for use in the present invention will hereinafter be referred to as eNB.

In embodiments of the present invention, a node is a fixed point that communicates with a UE to transmit or receive a radio frequency (RF) signal to or from the UE. Various eNBs may be used as a node irrespective of names thereof. For example, a BS, NB, eNB, pico-cell eNB (PeNB), home eNB (HeNB), relay, or repeater may be used as a node. Also, a BS may not be used as a node as necessary. For example, a radio remote head (RRH) or radio remote unit (RRU) may be used as a node. RRH or RRU may have a lower power level than the eNB. RRH and/or RRU (hereinafter referred to as RRH/RRU) may be generally connected to the eNB through a dedicated line such as an optical cable, such that coordinated communication of RRH/RRU or eNB can be performed more smoothly than coordinated communication of eNBs interconnected through a radio link. At least one antenna is installed at a node. The antenna may be a physical antenna. Alternatively, the antenna may be an antenna port, virtual antenna, or an antenna group. The node may be referred to as a point. In a conventional centralized antenna system (CAS) (that is, single node system), antennas are centralized in a BS or eNB such that the antennas are controlled by a single eNB controller. In a multi-node system, on the other hand, a plurality of nodes is generally disposed at predetermined intervals. The nodes may be managed by one or more eNB or eNB controllers that control operations of the respective nodes or schedule data to be transmitted or received through the respective nodes. Each node may be connected to an eNB or eNB controller that controls the corresponding node via a cable or dedicated line. In the multi-node system, the same cell identifier (ID) or different cell IDs may be used to transmit or receive a signal to or from a plurality of nodes. In a case in which a plurality of nodes has the same cell ID in the multi-node system, each node serves as a group of some antennas of one cell. In a case in which a plurality of nodes has different cell IDs in the multi-node system, on the other hand, the multi-node system may be considered as a multi-cell (e.g., macro-cell, femto-cell, or pico-cell) system. When multiple cells respectively formed by the plurality of nodes are arranged in coverages in an overlaying manner, a network constructed by the multiple cells is called a multi-tier network. A cell ID of RRH/RRU may be identical to or different from that of the eNB. If the RRH/RRU and the eNB use different cell IDs, each of the RRH/RRU and the eNB operates as an independent BS or eNB.

In the multi-node system to be described in the following description, one or more eNBs or eNB controllers connected to a plurality of nodes can simultaneously transmit signals to UE(s) or simultaneously receive signals from the UE(s) through all or some of the plurality of nodes. While multi-node systems are distinguished according to the nature and implementation form of each node, the multi-node systems are different from single-node systems (e.g., CAS, conventional MIMO system, conventional relay system, conventional repeater system, etc.) since a plurality of nodes participates in a process of providing a communication service to UEs over a predetermined time-frequency resource. Accordingly, methods for performing coordinated transmission of data using all or some of a plurality of nodes according to embodiments of the present invention can be applied to various types of multi-node systems. Though a node generally refers to an antenna group spaced apart from other nodes by over a predetermined distance, the following embodiments of the present invention can be applied even when the node means an antenna group regardless of spacing. For instance, in the case of an eNB including cross polarized (X-pol) antennas, the embodiments of the present invention can be applied on the assumption that the eNB controls nodes configured with H-pol antennas and nodes configured with V-pol antennas.

A communication scheme for transmitting/receiving data through a plurality of transmission (Tx)/receiving (Rx) nodes, a communication scheme for transmitting/receiving signals through at least one node selected from among a plurality of Tx/Rx nodes, or a communication scheme for employing different nodes for transmission of DL and UL signals is referred to as multi-eNB MIMO or Coordinated multi-point Tx/Rx (CoMP). Among these multi-point coordinated communications, coordinated transmission schemes can be largely classified into Joint Processing (JP) and scheduling coordination. The former can be classified into Joint Transmission (JT)/Joint Reception (JR) and Dynamic Cell Selection (DCS), and the latter can be classified into Coordinated Scheduling (CS) and Coordinated Beamforming (CB). DPS is also referred to as Dynamic Cell Selection (DCS). Compared to other coordinated communication schemes, when the JP scheme from among coordinated communication schemes between nodes is performed, many more communication environments can be formed. Among the JP schemes, JT refers to a communication scheme for enabling a plurality of nodes to transmit the same stream to a UE, and JR refers to a communication scheme for enabling a plurality of nodes to receive the same stream from a UE. The UE and the eNB may synthesize signals received from the plurality of nodes so as to recover the stream using the synthesized result. In case of JT/JR, since the same stream is transmitted to or received from the plurality of nodes, signal transmission reliability can be improved by 1 transmission diversity. DPS from among the JP schemes refers to a communication scheme in which signals are transmitted and received through one node selected from among a plurality of nodes according to a specific rule. In case of DPS, a good-channel-status node selected from among nodes will be generally selected as a communication node for communication with the UE, such that signal transmission reliability can be improved.

On the other hand, the term "Cell" refers to a predetermined geographical region in which one or more nodes can provide a communication service. Therefore, "communication with a specific cell" in the present invention may refer to communication with an eNB or node that provides a communication service to the specific cell. In addition, DL/UL signals of the specific cell may refer to DL/UL signals from the eNB or node that provides a communication service to the specific cell. A cell for providing a UL/DL communication service to the UE is referred to as a serving cell. A channel state/quality of a specific cell may refer to a channel state/quality of a communication link or a channel formed between the eNB (or node) providing a communication service to the specific cell and the UE. In the 3GPP LTE-A system, the UE may measure a DL channel state from the specific node using CSI-RS(s) transmitted on CSI-RS resources allocated to the specific node by antenna port(s) of the specific node. Generally, contiguous nodes may transmit the corresponding CSI-RS resources through orthogonal CSI-RS resources. Orthogonality of CSI-RS resources indicates that at least one of a CSI-RS resource configuration specifying symbols and subcarriers carrying a CSI-RS, a subframe configuration specifying subframes to which CSI-RS is allocated according to a subframe offset and a transmission period, and a CSI-RS sequence is different from each other.

In the present invention, a Physical Downlink Control Channel (PDCCH), a Physical Control Format Indicator Channel (PCFICH), a Physical Hybrid automatic retransmit request Indicator Channel (PHICH), and a Physical Downlink Shared CHannel (PDSCH) may indicate a set of REs carrying Downlink Control Information (DCI), a set of REs carrying Control Format Indicator (CFI), a set of REs carrying downlink ACK/NACK (ACKnowlegement/Negative ACK), and a set of REs carrying DL data, respectively. In addition, a Physical Uplink Control CHannel (PUCCH), a Physical Uplink Shared CHannel (PUSCH), and a Physical Random Access CHannel) (PRACH) may indicate a set of REs carrying Uplink Control Information (UCI), a set of REs carrying UL data, and a set of REs carrying a random access signal, respectively. In the present invention, RE that is assigned to or pertains to PDCCH/PCFICH/PHICH/PDSCH/PUCCH/PUSCH/PRACH may be called PDCCH/PCFICH/PHICH/PDSCH/PUCCH/PUSCH/PRACH RE or PDCCH/PCFICH/PHICH/PDSCH/PUCCH/PUSCH/PRACH resource. Therefore, in the present invention, PUCCH/PUSCH/PRACH transmission of a UE may be conceptuallay identical to UL control information/UL data/random access signal transmission on PUSCH/PUCCH/PRACH, respectively. In addition, PDCCH/PCFICH/PHICH/PDSCH transmission of a BS may be conceptually identical to DL data/control information transmission on PDCCH/PCFICH/PHICH/PDSCH, respectively.

FIG. 1 exemplarily shows a radio frame structure for use in a wireless communication system. In more detail, FIG. 1(a) shows a frequency division duplexing (FDD) frame structure for use in the 3GPP LTE/LTE-A system, and FIG. 1(b) shows a time division duplexing (TDD) frame structure for use in the 3GPP LTE/LTE-A system.

Referring to FIG. 1, a 3GPP LTE/LTE-A radio frame is 10 ms (307,200 Ts) in duration. The radio frame is divided into 10 equally-sized subframes, each subframe being 1 ms long. Subframe numbers may be assigned to the 10 subframes within the radio frame, respectively. For example, the 10 subframes may be sequentially numbered from 0 to 9. Ts represents a sampling time and is given as Ts=1/(2048×15 kHz). Each subframe is further divided into two slots, each 0.5 ms in duration. 20 slots are sequentially numbered from 0 to 19. A time interval in which one subframe is transmitted is defined as a Transmission Time Interval (TTI). Time resources may be distinguished by a radio frame number (or radio frame index), a subframe number (or subframe index), a slot number (or slot index), and the like.

A radio frame may be differently constructed according to a duplex mode. For example, in the FDD mode, DL transmission and UL transmission are discriminated according to a frequency, such that the radio frame includes only one of a DL subframe and a UL subframe in a specific frequency domain. On the other hand, in the TDD mode, DL transmission and UL transmission are discriminated according to time, such that a radio frame includes both a DL subframe and a UL subframe in a specific frequency domain.

Table 1 shows an exemplary DL-UL construction in a TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, D denotes a DL subframe, U denotes a UL subframe, and S denotes a special subframe. Specifically, the special subframe S includes three fields, i.e., a Downlink Pilot TimeSlot (DwPTS) field, a Guard Period (GP) field, and an Uplink Pilot TimeSlot (UpPTS) field. DwPTS is a time interval reserved for DL transmission, and UpPTS is a time interval reserved for UL transmission.

TABLE 2

| | | Normal cyclic prefix in downlink | | | Extended cyclic prefix in downlink | |
|---|---|---|---|---|---|---|
| | | | UpPTS | | | UpPTS |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

Figure 2:
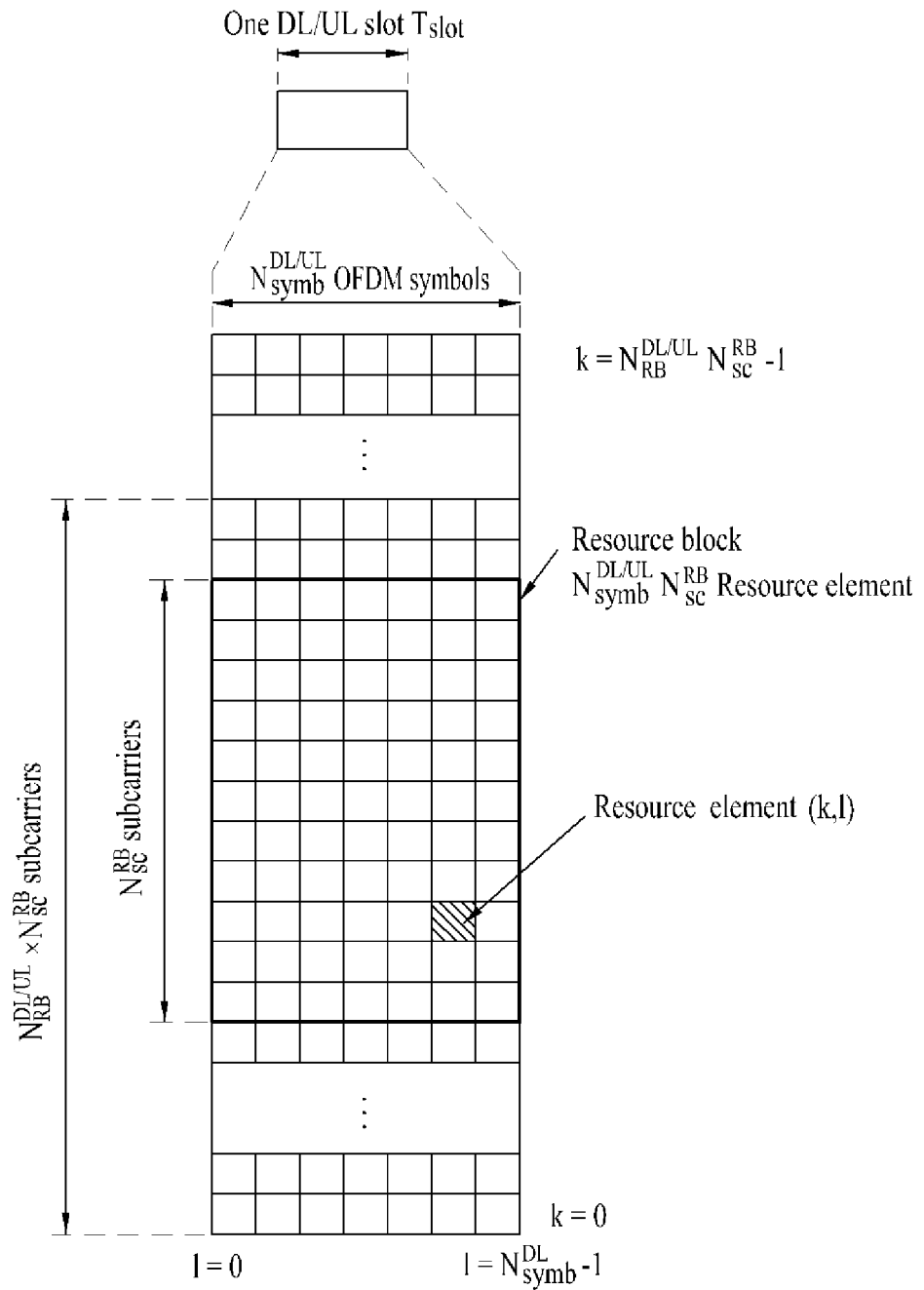
FIG. 2 exemplarily shows a downlink/uplink (DL/UL) slot structure for use in a wireless communication system.

FIG. 2 is a diagram showing an example of a downlink/uplink (DL/UL) slot structure in a wireless communication system. In particular, FIG. 2 shows the structure of a resource grid of a 3GPP LTE(-A) system. One resource grid exists per antenna port.

A slot includes a plurality of orthogonal frequency division multiplexing (OFDM) symbols in a time domain and includes a plurality of resource blocks (RBs) in a frequency domain. The OFDM symbol means one symbol slot. Referring to FIG. 2, a signal transmitted in each slot may be expressed by a resource grid including $N^{DL/UL}_{RB} * N^{RB}_{sc}$ subcarriers and $N^{DL/UL}_{symb}$ OFDM symbols. $N^{DL}_{RB}$ denotes the number of resource blocks (RBs) in a DL slot and $N^{UL}_{RB}$ denotes the number of RBs in a UL slot. $N^{DL}_{RB}$ and $N^{UL}_{RB}$ depend on a DL transmission bandwidth and a UL transmission bandwidth. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, an SC-FDM symbol, etc. according to multiple access scheme. The number of OFDM symbols included in one slot may be variously changed according to channel bandwidth and CP length. For example, in a normal cyclic prefix (CP) case, one slot includes seven OFDM symbols. In an extended CP case, one slot includes six OFDM symbols. Although one slot of a subframe including seven OFDM symbols is shown in FIG. 2 for convenience of description, the embodiments of the present invention are similarly applicable to subframes having a different number of OFDM symbols. Referring to FIG. 2, each OFDM symbol includes $N^{DL/UL}_{RB} * N^{RB}_{sc}$ subcarriers in a frequency domain. The type of the subcarrier may be divided into a data subcarrier for data transmission, a reference signal subcarrier for reference signal transmission and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency.

One RB is defined as $N^{DL/UL}_{symb}$ (e.g., 7) consecutive OFDM symbols in a time domain and defined as $N^{RB}_{sc}$ (e.g., 12) consecutive subcarriers in a frequency domain. For reference, resource including one OFDM symbol and one subcarrier is referred to a resource element (RE) or tone. Accordingly, one RB includes $N^{DL/UL}_{symb} * N^{RB}_{sc}$ REs. Each RE within a resource grid may be uniquely defined by an index pair (k, l) within one slot. k is an index applied from 0 to $N^{DL/UL}_{RB} * N^{RB}_{sc} - 1$ in a frequency domain, and l is an index from 0 to $N^{DL/UL}_{symb} - 1$ in a time domain.

In one subframe, two RBs respectively located in two slots of the subframe while occupying the same $N^{RB}_{sc}$ consecutive subcarriers is referred to as a physical resource block (PRB) pair. Two RBs configuring a PRB pair have the same PRB number (or the same PRB index). A VRB is a logical resource allocation unit introduced for resource allocation. The VRB has the same size as the PRB. The VRB is classified into a localized VRB and a distributed VRB according to the method of mapping the PRB to the VRB. Localized VRBs are directly mapped to PRBs and thus VRB number (VRB index) directly corresponds to PRB number. That is, $n_{PRB} = n_{VRB}$. The localized VRBs are numbered from 0 to $N^{DL}_{VRB} - 1$ and $N^{DL}_{VRB} = N^{DL}_{RB}$. Accordingly, according to the localized mapping method, VRBs having the same VRB number are mapped to RRBs having the same PRB number in a first slot and a second slot. In contrast, the distributed VRB is mapped to the PRB through interleaving. Accordingly, the distributed VRBs having the same VRB number may be mapped to RRBs having different PRB numbers in a first slot and a second slot. Two PRBs which are respectively located in two slots of a subframe and have the same VRB number are referred to as a VRB pair.

In one subframe, two RBs respectively located in two slots of the subframe while occupying contiguous $N^{RB}_{sc}$ same subcarriers are referred to as a physical resource block (PRB) pair. Two RBs constituting a PRB pair have the same PRB number (or PRB index).

Figure 3:
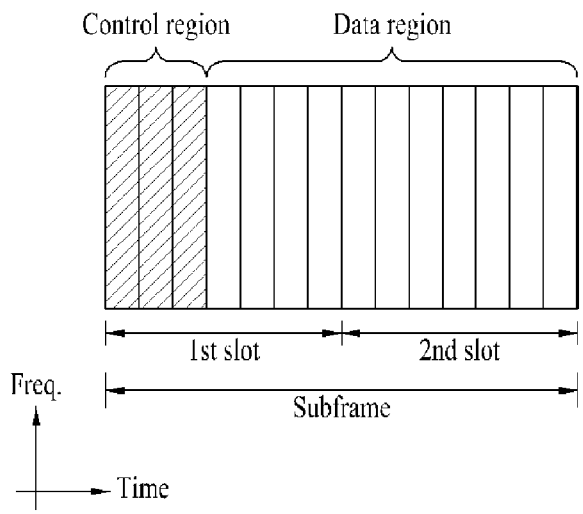
FIG. 3 exemplarily shows a downlink (DL) subframe structure for use in a 3GPP LTE/LTE-A system.

FIG. 3 is a view showing an example of a DL subframe structure used in a 3GPP LTE/LTE-A system.

Referring to FIG. 3, a DL subframe may be divided into a control region and a data region in a time domain. Referring to FIG. 3, maximum three (or four) front OFDM symbols in a first slot of the subframe correspond to the control region to which a control channel is assigned. Hereinafter, a resource region of the DL subframe available for PDCCH transmission will be referred to as a PDCCH region. The remaining OFDM symbols other than OFDM symbol(s) used as a control region correspond to the data region to which a Physical Downlink Shared Channel (PDSCH) is assigned. Hereinafter, a resource region of the DL subframe available for PDSCH transmission will be referred to as a PDSCH region. Examples of DL control channels used in 3GPP LTE include a Physical Control Format Indicator Channel (PCFICH), Physical Downlink Control Channel (PDCCH), and Physical hybrid ARQ indicator Channel (PHICH). PCFICH carries information regarding the number of OFDM symbols transmitted from the first OFDM symbol of a subframe and used to transmit a control channel in the subframe. PHICH carries a Hybrid Automatic Repeat Request acknowledgment/negative-acknowledgment (HARQ ACK/NACK) signal in response to UL transmission.

Control information transmitted through PDCCH is referred to as Downlink Control Information (DCI). DCI includes resource assignment information for a UE or UE group and other Control Information. For example, DCI includes transmission format and resource assignment information of a downlink shared channel (DL-SCH), transmission format and resource assignment information of an uplink shared channel (UL-SCH), paging information on a paging channel (PCH), system information on DL-SCH, resource assignment information of an upper layer control message, such as arbitrary connection response, transmitted on PDSCH, a Transmit Control Command Set regarding individual UEs in a UE group, a Transmit Power Control (TPC) command, Voice over IP (VoIP) activation indication information, and a Downlink Assignment Index (DAI). Transmission format and resource assignment information of a downlink shared channel (DL-SCH) is also referred to as DL scheduling information or DL grant, and transmission format and resource assignment information of an uplink shared channel (UL-SCH) is also referred to as UL scheduling information or UL grant. DCI carried by one PDCCH may have different sizes and usages according to a DCI format. If necessary, the DCI size may also be changed according to a coding rate. A variety of DCI formats are defined in the 3GPP LTE system, for example, formats 0 and 4 for uplink, and formats 1, 1A, 1B, 1C, 1D, 2, 2A, 2B, 2C, 3, 3A, etc. for downlink. DCI format may selectively include a variety of control information according to various usages, such that the selected control information is transmitted as DL control information to the UE. For example, DCI format may selectively include a hopping flag, RB allocation, modulation coding scheme (MCS), redundancy version (RV), new data indicator (NDI), transmit power control (TPC), cyclic shift demodulation reference signal (CS DM RS), channel quality information (CQI) request, HARQ process number, transmitted precoding matrix indicator (TPMI), precoding matrix indicator (PMI) confirmation, etc.

Generally, a DCI format capable of being transmitted to the UE may be changed according to a UE-configured transmission mode TM. In other words, for a UE configured in a specific transmission (Tx) mode, instead of all DCI formats, only some DCI format(s) corresponding to the specific Tx mode can be used.

PDCCH is transmitted on a control channel element (CCE) or an aggregate (or aggregation) of contiguous CCEs. CCE is a logical assignment unit used to provide a coding rate based on a wireless channel status to PDCCH. CCE corresponds to a plurality of resource element groups (REGs). For example, one CCE corresponds to nine REGs, and one REG corresponds to four REs. In case of the 3GPP LTE system, a CCE set in which PDCCH can be located for each UE is defined. A CCE set from which a UE can find its own PDCCH is referred to as a PDCCH search space or simply a search space (SS). An individual resource, to which PDCCH can be transmitted in the search space, is referred to as a PDCCH candidate. A set of PDCCH candidates to be monitored by a UE is defined as a search space. In a 3GPP LTE/LTE-A system, search spaces for respective DCI formats may have different sizes. A dedicated search space and a common search space are defined in the 3GPP LTE/LTE-A system. The dedicated search space is a UE-specific search space, and is configured for each UE. The common search space is configured for a plurality of UEs. One PDCCH candidate corresponds to one, two, four, or eight CCEs according to a CCE aggregation level. The eNB or BS transmits real PDCCH (DCI) on an arbitrary PDCCH candidate in a search space, and UE monitors the search space to find the PDCCH (DCI). Monitoring means attempt to decode individual PDCCH in a corresponding search space according to all monitored DCI formats. A UE may monitor a plurality of PDCCHs to detect its own PDCCH. Because a UE does not basically know a position from which its own PDCCH is transmitted, the UE attempts to decode all PDCCHs of a corresponding DCI format every subframe until the UE detects a PDCCH having an identifier thereof. This procedure is referred to as blind decoding (BD).

The eNB or BS may transmit data for a UE or a UE group through a data region. Data transmitted through the data region may also be referred to as user data. To transmit user data, a Physical Downlink Shared CHannel (PDSCH) may be assigned to the data region. A Paging channel (PCH) and a Downlink-shared channel (DL-SCH) are transmitted through a PDSCH. A UE may decode control information transmitted through a PDCCH to read data transmitted through a PDSCH.

Information regarding which UE or UE group is used as a transmission destination of PDSCH data, or information regarding how the UE or UE group receives and decodes PDSCH data is contained in PDCCH, so that the resultant PDCCH is transmitted. For example, it is assumed that a specific PDCCH is Cyclic redundancy check (CRC) masked with a Radio Network Temporary Identity (RNTI) of "A", and information regarding data transmitted using radio resources (for example, frequency position) of "B" and transmission format information (for example, transmission block size, modulation scheme, coding information, etc.) of "C" is transmitted through a specific DL subframe. A UE monitors PDCCH using its own RNTI information. A UE having an RNTI of "A" detects PDCCH, and receives PDSCH indicated by "B" and "C" through information of the received PDCCH.

In order to demodulate signals received from the eNB by the UE, the UE needs to use a reference signal (RS) to be compared with a data signal. The reference signal (RS) may refer to a predefined special waveform signal known to the eNB and the UE, and may be transmitted from the eNB to the UE or from the UE to the eNB. If necessary, the RS may also be referred to as a pilot. Reference signals (RSs) are classified into a cell-specific RS commonly used for all UEs of a cell and a demodulation RS (DM RS) dedicated for a specific UE. DM RS transmitted from the eNB to demodulate DL data for a specific UE may also be referred to as a UE-specific RS. Although DM RS and CRS may be simultaneously transmitted on downlink, it should be noted that only one of the DM RS and the CRS may be transmitted as necessary. Assuming that only DM RS other than CRS is transmitted on downlink, a DM RS transmitted using the same precoder as in data may be used only for demodulation, such that a channel measurement RS must be provided separately. For example, in order to measure channel state information by the UE in 3GPP LTE(-A), CSI-RS acting as the additional measurement RS is transmitted to the UE. CSI-RS has a relatively low time-variation level in channel state information, such that the CSI-RS is transmitted at intervals of a predetermined time composed of a plurality of subframes in a different way from the CRS transmitted per subframe.

The embodiment of the present invention provides a method for generating a DM-RS sequence by selecting a specific DM-RS sequence from among the list of semi-statically established DM-RS sequence candidates through conventional or additional bit information of downlink control information (DCI), under the condition that dynamic Dm-RS management and operation are requested according to the CoMP (Coordinated Multiple Point transmission/reception) scheme in a downlink environment of the multi-cell wireless communication system, resulting in an increased variance of DM-RS sequence allocation. In addition, in order to solve limitation of the list of DM-RS sequence candidates selectable as the bit information when a specific DM-RS sequence is selected from among the list of DM-RS sequence candidates, the embodiment of the present invention further proposes a method for differently interpreting the corresponding DL control information in a transmission mode or specific environment condition in which specific DM-RS sequence allocation is supported as a fall-back operation, resulting in an increased variance of DM-RS sequence allocation.

A wireless communication system such as 3GPP LTE supports a UE-specific RS, to which the same precoding method as in data is applied, to be utilized for channel estimation, such that it can support UEs that can receive precoded data in a PDSCH region. For example, the LTE Rel-8 system transmits a UE-specific RS for a UE configured to receive beamforming data through an antenna port #5. The LTE Rel-9 system transmits a UE-specific RS through antenna ports #7 and #8 discriminated by a Walsh code having a length of 2 so as to support either transmission of two spatial layers for a single UE or MU (Multi-User)-MIMO transmission in which each of two UEs utilizes a single beam. A UE-specific RS for use in Rel-9 is extended to a DM-RS for use in LTE Rel-10. The DM-RS is identified by a Walsh code having a length of 2 or 4, and supports the MIMO scheme that is capable of using 8 spatial layers using a maximum of 8 antenna ports #7 to #14.

Figure 5:
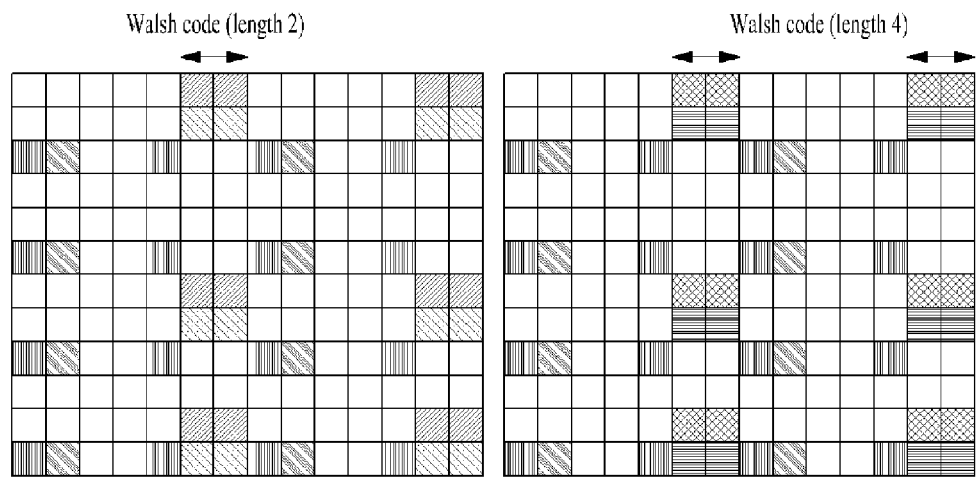
FIG. 5 shows time-frequency resources of Cell-specific Reference Signal (CRS) and DeModulation Reference Signal (DM-RS) for use in an LTE(-A) system.

FIG. 5 shows a DM-RS pattern for use in the LTE-10 system. In more detail, FIG. 5(a) shows a DM-RS pattern when a MIMO channel has ranks of 1 to 4, and FIG. 5(b) shows a DM-RS pattern when a MIMO channel has ranks of 5 to 8.

DM-RS is generated using indicating a physical layer cell identifier as a seed. For example, for antenna ports p∈{7, 8, ..., γ+6}, DM RS may be defined by the following Math Figure 1.

MathFigure 1

$$r(m) = \frac{1}{\sqrt{2}}(1-2\cdot c(2m)) + j\frac{1}{\sqrt{2}}(1-2\cdot c(2m+1)),$$ [Math. 1]

$$m = \begin{cases} 0, 1, \ldots, 12N_{RB}^{max,DL}-1 & \text{normal cyclic prefix} \\ 0, 1, \ldots, 16N_{RB}^{max,DL}-1 & \text{extended cyclic prefix} \end{cases}$$

In Math Figure 1, $N^{max,DL}_{RB}$ is the largest downlink bandwidth configuration, and may be denoted by an integer multiple of $N^{RB}_{sc}$. Here, a pseudo-random sequence c(i) may be defined by a length-31 Gold sequence. An output sequence c(n) (where n=0, 1, ..., $M_{PN}$−1) having a length of MPN is defined according to the following Math Figure 2.

MathFigure 2

$$c(n) = (x_1(n+N_C) + x_2(n+N_C)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2$$ [Math.2]

Here, $N_C$=1600 and a first m-sequence is initialized to $x_1(0)$=1, $x_1(n)$=0, n=1, 2, ..., 30. Initialization of a second m-sequence is represented by the following Math Figure 3 having a value depending on application of the sequence.

MathFigure 3

$$c_{init} = \sum_{i=0}^{30} x_2(i) \cdot 2^i$$ [Math.3]

Figure 4:
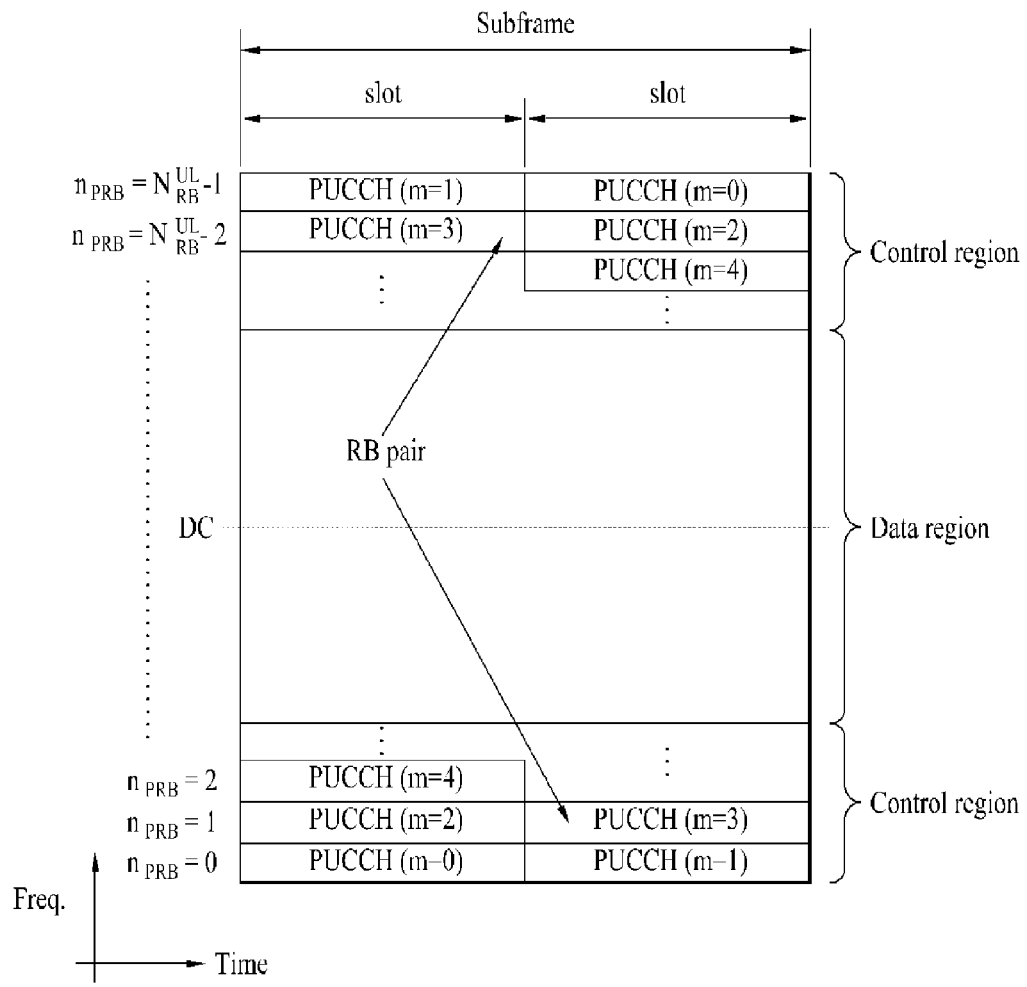
FIG. 4 exemplarily shows an uplink (UL) subframe for use in a 3GPP LTE/LTE-A system.

In Math Figure 1, a pseudo-random sequence generator is initialized to $c_{init}$ at the beginning of each subframe according to the following Math Figure 4.

MathFigure 4

$$c_{init} = (\lfloor n_s/2 \rfloor + 1) \cdot (2N_{ID}^{cell} + 1) \cdot 2^{16} + n_{SCID}$$ [Math.4]

In Math Figure 4, if nSCID is not specified, nSCID is set to zero. For PDSCH transmission on Antenna Port 7 or 8, nSCID is given by DCI format 2B or 2C related to PDSCH transmission. DCI format 2B is a DCI format for resource assignment for a PDSCH that uses a maximum of two antenna ports each having a DM RS, and DCI format 2C is a DCI format for resource assignment for a PDSCH that uses a maximum of 8 antenna ports each having a DM RS. In case of DCI format 2B, nSCID may be indicated by a scrambling ID field according to Table 3. In case of DCI format 2C, nSCID may be indicated by a scrambling ID field according to Table 4.

TABLE 3

| Scrambling identity field in DCI format 2B | $n_{SCID}$ |
|---|---|
| 0 | 0 |
| 1 | 1 |

TABLE 4

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID}$ = 0 | 0 | 2 layers, ports 7-8, $n_{SCID}$ = 0 |
| 1 | 1 layer, port 7, $n_{SCID}$ = 1 | 1 | 2 layers, ports 7-8, $n_{SCID}$ = 1 |
| 2 | 1 layer, port 8, $n_{SCID}$ = 0 | 2 | 3 layers, ports 7-9 |
| 3 | 1 layer, port 8, $n_{SCID}$ = 1 | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

Referring to Math Figures 1 to 4, when the eNB generates a DM-RS to be transmitted to a specific cell, the eNB applies the same physical layer cell ID ($N_{ID}^{cell}$) to all UEs. In the 3GPP LTE(-A) system, one UE receives a DL signal in only one cell, such that the UE needs to recognize one $N_{ID}^{cell}$ and one nSCID to detect its own DM-RS. Referring to Math Figure 4, UEs located in one cell may initialize a pseudo-random sequence generator configured to the RS sequence using the same $N_{ID}^{cell}$.

From the viewpoint of one UE, the UE receives a DL signal from only one cell, such that the UE uses only one $N_{ID}^{cell}$ to generate a DM-RS. That is, a UE for use in the conventional system receives a DL signal in only one cell, such that the UE can use a cell (DL) based DM-RS sequence. In other words, since a downlink (DL) cell and an uplink (UL) cell are identical to each other in the conventional communication system and UL/DL transmission is performed in only one cell in the conventional communication system, the UE obtains $N_{ID}^{cell}$ on the basis of downlink (DL) synchronization signals (i.e., Primary Synchronization Signal (PSS) and Secondary Synchronization Signal (SSS)) received from the serving cell, and uses the obtained $N_{ID}^{cell}$ to generate UL/DL RS sequences.

However, under the DL CoMP situation, a plurality of cells or transmission points (TPs) may simultaneously participate in transmission of a DL signal for one UE, or may also selectively transmit a DL signal to the UE. For example, one of two points may perform DL data transmission (e.g., PDSCH transmission) or the other point may perform no transmission of DL data (in case of CB/CS or DPS). In another example, two points may perform DL data transmission (in case of JT). In addition, under the UL CoMP situation, one UE may perform UL transmission for a plurality of cells or reception points (RPs) or may also perform UL transmission for the plurality of cells or some of RPs. In this case, assuming that a transmitter transmits an RS sequence generated on the basis of $N_{ID}^{cell}$ of the legacy serving cell according to the conventional scheme, a receiver may not detect the corresponding RS sequence.

In Math Figure 1, $N_{ID}^{cell}$ is used as a variable for obtaining the interference randomization effect by allocating different DM-RS sequences acting as cell IDs to contiguous cells, and $n_s$ is a variable that randomizes correlation with a contiguous cell DM-RS sequence using a slot number within one radio frame. In addition, nSCID is a variable that quasi-orthogonally supports a maximum of two UEs other than two MU-MIMO UEs through an orthogonal cover code (OCC) based on Walsh codes within the same cell. However, the LTE-A has recently considered DM-RS sequence assignment that is not cell-specifically defined to support the CoMP scheme. For example, assuming that the same physical cell ID (hereinafter referred to as PCID) is configured under the environment including a single eNB (e.g., eNB1) and a plurality of transmission points (TPs) (e.g., TP1 and TP2) as shown in FIG. 6, a specific scenario (e.g., CoMP scenario 4) may be used.

Figure 6:
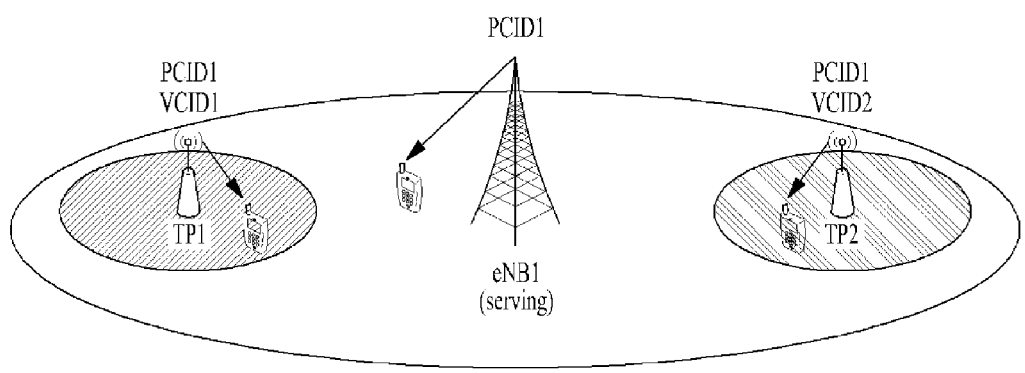
FIG. 6 exemplarily shows Coordinated Multiple Point transmission/reception (CoMP) operations according to one embodiment of the present invention.
Figure 7:
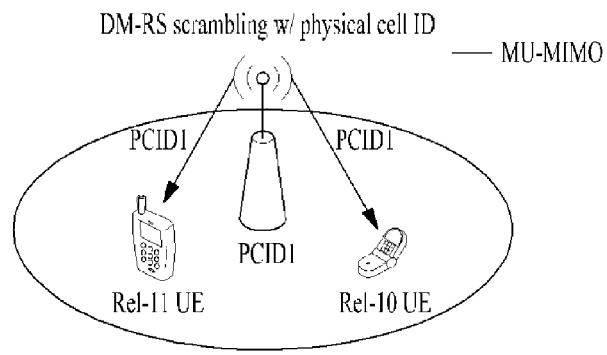
FIG. 7 exemplarily shows Coordinated Multiple Point transmission/reception (CoMP) operations according to one embodiment of the present invention.
Figure 7:
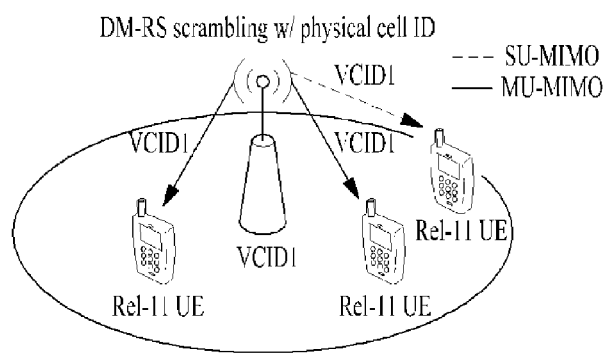

In order to obtain a cell splitting gain from the above-mentioned environment of FIG. 6, each TP must perform localized transmission. Here, there is a need to use different DM-RS sequences for interference randomization between DM-RSs transmitted from respective TPs. In order to satisfy the above-mentioned necessity, an initial value of a DM-RS sequence may be defined as a TP-specific virtual cell ID (VCID) in LTE Rel-11. Here, under the CoMP environment, the UE may use PCID-based DM-RS sequences for scheduling with the legacy LTE Rel-10 UEs. Alternatively, the UE may use VCID-based DM-RS sequences for scheduling with the LTE Rel-11 UEs, and the DM-RS sequence assignment must be dynamically supported according to the scheduling period. FIG. 7 exemplarily shows the CoMP operations according to one embodiment of the present invention.

Figure 8:
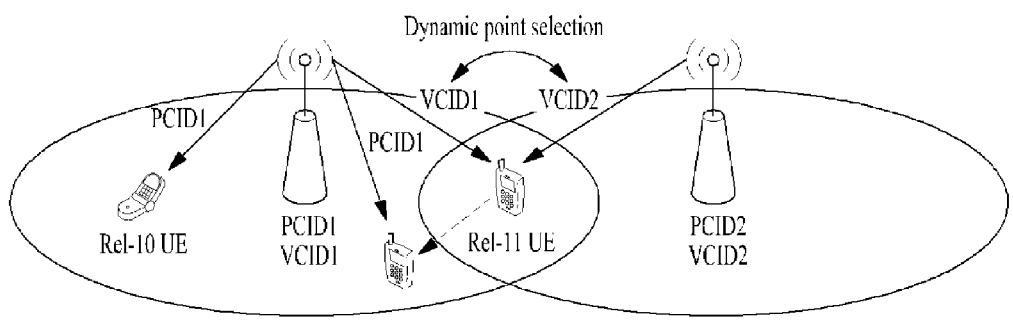
FIG. 8 exemplarily shows Coordinated Multiple Point transmission/reception (CoMP) operations according to one embodiment of the present invention.

In accordance with one method for dynamically supporting DM-RS sequence assignment, the list of candidates of DM-RS sequence initial values (although the DM-RS sequence initial values are actually used as pseudo-random sequence initial values for DM-RS sequence generation, each of the DM-RS sequence initial values will hereinafter be referred to as "DM-RS sequence initial value") is notified to a UE through higher layer signaling such as RRC signaling, a method for selecting a specific DM-RS sequence initial value from among the list of candidates through the legacy scrambling identifier (SCID) information of DCI or additional bit information may be used. For example, as can be seen from the environment of FIG. 7, assuming that PCID1 is selected as an initial value for scheduling with LTE Rel-10 UEs and VCID1 is selected as an initial value for scheduling with LTE Rel-11 UEs, the candidate list of DM-RS sequence initial values may be defined as {PCID1, VCID1} through RRC signaling. If the corresponding SCID or bit is set to '0' using SCID of DCI or additional 1-bit information, PCID1 is selected. In contrast, if the corresponding SCID or bit is set to '1' using SCID of DCI or additional 1-bit information, VCID1 is selected. However, in case of selecting a representative dynamic point selection (DPS) scheme from among the CoMP schemes, a specific DM-RS sequence initial value may not be represented by SCID or 1-bit information as necessary. The number of DM-RS sequences capable of being dynamically allocated by the DPS scheme is proportional to the number of TPs capable of being dynamically selected. Assuming that the number of TPs is increased and the size of candidate list is set to 3 or more, there may occur a DM-RS sequence incapable of being selected as one bit (1 bit) shown in the above example. Alternatively, even in the case where the number of TPs to be used for DPS is set to 2 under the CoMP environment (e.g., CoMP scenario 4) in which the eNB and TPs utilize the same PCID1 as shown in FIG. 8, assuming that DM-RS sequences based on different VCIDs (e.g., VCID1 and VCID2) of individual TPs are used for interference randomization with the eNB and a DM-RS sequence based on PCID (e.g., PCID1) is used to support scheduling for Rel-10 UE, the list of candidates of DM-RS sequences must be {PCID1, VCID1, VCID2} from the viewpoint of the LTE Rel-11 UE configured to perform the DPS operation, and may be denoted by one bit (1 bit).

On the other hand, the LTE system has defined a transmission (Tx) mode for supporting various MIMO schemes when user data is transmitted to the PDSCH region. For example, in LTE Rel-10, TM1 refers to a single transmission (Tx) antenna scheme, TM2 refers to a transmission (Tx) diversity scheme, and TM3 to TM9 are defined in the following Table 5.

TABLE 5

| Transmission mode | DCI format | Search Space | Transmission scheme of PDSCH corresponding to PDCCH |
|---|---|---|---|
| Mode 1 | DCI format 1A | Common and UE specific by C-RNTI | Single-antenna port, port 0 |
| | DCI format 1 | UE specific by C-RNTI | Single-antenna port, port 0 |
| Mode 2 | DCI format 1A | Common and UE specific by C-RNTI | Transmit diversity |
| | DCI format 1 | UE specific by C-RNTI | Transmit diversity |
| Mode 3 | DCI format 1A | Common and UE specific by C-RNTI | Transmit diversity |
| | DCI format 2A | UE specific by C-RNTI | Large delay CDD or Transmit diversity |
| Mode 4 | DCI format 1A | Common and UE specific by C-RNTI | Transmit diversity |
| | DCI format 2 | UE specific by C-RNTI | Closed-loop spatial multiplexing or Transmit diversity |
| Mode 5 | DCI format 1A | Common and UE specific by C-RNTI | Transmit diversity |
| | DCI format 1D | UE specific by C-RNTI | Multi-user MIMO |
| Mode 6 | DCI format 1A | Common and UE specific by C-RNTI | Transmit diversity |
| | DCI format 1B | UE specific by C-RNTI | Closed-loop spatial multiplexing using a single transmission layer |
| Mode 7 | DCI format 1A | Common and UE specific by C-RNTI | If the number of PBCH antenna ports is one, Single-antenna port, port 0 is used, otherwise Transmit diversity |
| | DCI format 1 | UE specific by C-RNTI | Single-antenna port, port 5 |
| Mode 8 | DCI format 1A | Common and UE specific by C-RNTI | If the number of PBCH antenna ports is one, Single-antenna port, port 0 is used, otherwise Transmit diversity |
| | DCI format 2B | UE specific by C-RNTI | Dual layer transmission, port 7 and 8 or single-antenna port, port 7 or 8 |
| Mode 9 | DCI format 1A | Common and UE specific by C-RNTI | Non-MBSFN subframe: If the number of PBCH antenna ports is one. Single-antenna port, port 0 is used, otherwise Transmit diversity MBSFN subframe: Single-antenna port, port 7 |
| | DCI format 2C | UE specific by C-RNTI | Up to 8 layer transmission, ports 7-14 or single-antenna port, port 7 or 8 |

In this case, each transmission (Tx) mode includes a DCI format for supporting a MIMO scheme supported by the corresponding transmission mode and a DCI format for a fall-back operation when it is impossible to support the MIMO scheme. Therefore, the UE initially searches for a DCI format for a MIMO scheme supported by the transmission mode in a PDCCH region. If the corresponding DCI format is not present, the UE searches for a DCI format for the fall-back operation such that the UE performs the fall-back operation. Here, PDCCH is transmitted through one or more control channel elements (CCEs), and each CCE includes 9 resource element groups (REGs). In LTE, a UE is designed to consider only a limited CCE aggregate so as to reduce complexity when finding its own control information. The limited CCE region is defined as a search space (SS), and may have a different size according to each PDCCH format. The SS may be largely classified into a common search space (CSS) and a UE-specific search space (USS). CSS is commonly known to all UEs, and USS is recognized by a specific UE only. However, it should be noted that CSS may overlap with USS as necessary.

Assuming that dynamic DM-RS sequence assignment is requested according to the DL CoMP scheme of the multi-cell wireless communication system, in order to solve limitation of the list of candidates of DM-RS sequences selectable as the bit information when a specific DM-RS sequence from among the list of candidates of DM-RS sequences that are quasi-statically established is selected through the conventional or additional bit information, the embodiment of present invention provides a method for employing a transmission (Tx) mode that supports specific DM-RS sequence assignment using a combination of subframe information through higher layer signaling and a fall-back operation, or a method for increasing a variable range of DM-RS sequence assignment by differently interpreting the DCI on the basis of a specific environment condition such as subframe information, etc. The operations of the embodiments under the environment, in which dynamic DM-RS sequences are allocated using conventional or additional bit information of DCI in the LTE system to which the DPS scheme of CoMP and the MU-MIMO scheme of LTE Rel-10 UE are applied according to scheduling, will hereinafter be described in detail.

First Embodiment

A new transmission mode for supporting specific DM-RS sequence assignment in a fall-back operation according to embodiments of the present invention will hereinafter be described in detail. DM-RS sequence of LTE Rel-11 UE may be generated on the basis of PCID so as to implement MU-MIMO transmission for the legacy Rel-10 UEs. DM-RS sequence may also be generated on the basis of VCID so as to implement not only SU-MIMO transmission for LTE Rel-11 UE but also MU-MIMO transmission for LTE Rel-11 UEs. However, PCID-based DM-RS sequence assignment for scheduling with Rel-10 UEs may restrict the CoMP scheme utilizing VCID-based DM-RS sequences. For example, as can be seen from FIGS. 3 and 4, assuming that DM-RS sequence assignment is operated according to the DPS scheme and 1-bit information of DCI is utilized, VCID1 and VCID2 need to be contained in the list of candidates of DM-RS sequence initial values so as to support the correct DPS operation. However, PCID must be contained in the candidate list so as to support scheduling with the LTE Rel-10 UEs using the same DCI format. In this case, the operations of the DPS scheme must be restricted. Therefore, one embodiment of the present invention proposes a method for performing PCID-based DM-RS sequence assignment supporting LTE Rel-10 in the fall-back operation. On the other hand, PCID for DM-RS sequence generation or assignment according to one embodiment of the present invention is not always used to support LTE Rel-10 UE.

As one example of the fall-back operation, a method for utilizing DCI format 1A of the legacy LTE system may be used. In this case, as can be seen from Table 5, DCI format 1A performs CRS-based data transmission/reception (Tx/Rx) operations transmitted from Antenna Port #0 at a normal subframe, and performs DM-RS based data Tx/Rx operations transmitted from Antenna Port #7 at an MBSFN subframe. Accordingly, when DCI format 1A is used as the fall-back operation, a DM-RS sequence initial value is defined as PCID at a specific location established as the MBSFN subframe, and scheduling with LTE Rel-10 UEs may be carried out in the MBSFN subframe region. In this case, the DM-RS sequence initial value for the fall-back operation is not always set to a PCID, and may also be set to a different value as necessary.

For example, assuming that dynamic selection based on DCI bit information is selected from among the list of candidates of DM-RS sequences determined through higher layer signaling for DCI formats supporting the MIMO scheme in each transmission (Tx) mode, a DM-RS sequence initial value may always be set to a specific value from among the list of DM-RS sequence candidates even in case of DCI format for the fall-back operation.

For example, assuming that a DM-RS sequence initial value is defined as {nSCID=0, X1} or {nSCID=0, X2} according to a value of SCID within the set {X1, X2} given from a higher layer in case of DCI format 2C of TM 9 of the LTE system, DCI format 1A sets an initial value of a DM-RS sequence to X1 on the condition that a value of SCID is set to a value of 0, or DCI format 2C may disregard the relationship among SCID, X1 and X2 and may set the value of X2 to a DM-RS sequence initial value. In other words, a DM-RS sequence initial value related to a specific SCID (e.g., SCID 0) in DCI format 2C may always be used for DCI format 1A for the fall-back operation. That is, if an initial value of this sequence at DCI format 2C is semi-statically signaled, this value may also be applied to DCI format 1A without change.

In another example, a UE receiving ePDCCH may set a DM-RS sequence initial value applied to the ePDCCH to a DM-RS sequence initial value for the fall-back mode.

In addition, a higher layer signal indicating separate DM-RS based data transmission may be defined for Rel-11 UEs other than higher layer signals indicating MBSFN subframe information. Alternatively, if the UE having received DCI format 1A has successfully performed searching in the CSS region, the UE transmits and receives CRS-based data. If the UE has successfully performed searching in the USS region, the UE may transmit and receive DM-RS based data on the basis of the DM-RS sequence initial value. In this case, the CRS-based operation may be performed in the overlap region of USS and CSS in the same manner as in the CSS region.

The fall-back operation described in the above-mentioned embodiments is not always limited to Rel-10 UE, and may also be applied to Rel-11 UE.

Second Embodiment

The second embodiment of the present invention proposes a method for classifying the list of candidates of DM-RS sequence initial values to be dynamically allocated into a plurality of subsets, each of which has a predetermined size capable of being represented through a control signal, and allocating different DM-RS sequence initial values to individual resource regions, thereby increasing variance of DM-RS sequence assignment. If the DPS scheme is used as a representative CoMP scheme, the number of DM-RS sequence initial values capable of being dynamically allocated is identical to the number of independent TPs participating in DPS. On the other hand, assuming that the list of candidates of DM-RS sequence initial values is represented using N bits of DCI, a total of 2N DM-RS sequence initial value candidate lists can be represented. In this case, as shown in FIG. 8, the number of DM-RS sequence initial values required for supporting the DPS scheme or Rel-10 operation may be higher than 2N. Accordingly, one embodiment of the present invention proposes a method for limiting the list of candidates of DM-RS sequence initial values actually applied to respective resource regions so as to increase variance of DM-RS sequence assignment.

Figure 9:
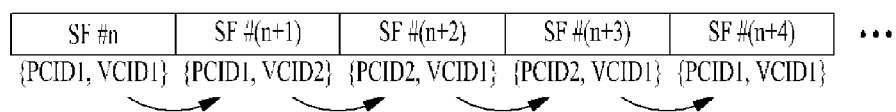
FIG. 9 exemplarily shows Coordinated Multiple Point transmission/reception (CoMP) operations according to one embodiment of the present invention.

For example, assuming that the candidate list of sequence initial values is denoted by {PCID1, VCID1, VCID2} as shown in FIG. 8, a subset (having a predetermined size of 2) of the sequence initial value candidate list is established according to a subframe as shown in FIG. 9 such that DM-RS dynamic assignment can be carried out.

FIG. 9 shows a method for selecting a cell ID selected in each subframe and one cell ID unused in a current subframe from among two cell IDs contained in the remaining candidate list, and constructing a subset of the initial value candidate list for the next subframe. Information regarding an initial subset obtained after transmission of the entire candidate list of sequence initial values must be additionally transferred to the UE through higher layer signaling. A method for constructing the above-mentioned subset is not limited thereto. For example, the method for constructing the above-mentioned subset may be designed in a manner that the subset always includes a PCID to support scheduling for LTE Rel-10 UEs.

In addition, the specific resource region is not always set to the subframe. For example, the specific resource region may also be used according to a hybrid automatic repeat request (HARQ) process. The HARQ process includes a total of 8 processes. In DCI format, the HARQ process may be denoted by 3 bits (for FDD) or 4 bits (for TDD). A value indicating each HARQ process is referred to as a HARQ process ID or number. For example, the HARQ processes #0 to #3 described in the above example may establish {PCID1, VCID1} to the list of DM-RS sequence initial value candidates, and support scheduling of Rel-10 UE and Rel-11 UE. The HARQ processes #4 to #7 may establish {VCID1, VCID2} to the list of DM-RS sequence initial value candidates, and support the DPS scheme.

Third Embodiment

The third embodiment of the present invention proposes a method for simultaneously utilizing legacy information (i.e., SCID) of DL control signal information and additional bit information so as to support DM-RS sequence assignment. As one example of methods for dynamically allocating the DM-RS sequence, a method for employing SCID contained in the legacy DCI may be used. For example, DCI format 2C of TM9 according to the LTE system indicates each of SCID and spatial layer information by 3 bits (as can be seen from Table 4).

One embodiment of the present invention proposes a method for performing flexible DM-RS assignment by adding bit information to SCID. For example, assuming that one bit is added to DCI format 2C, the amount of state information capable of being represented is about double that of the conventional state information. In this case, when the additional 1-bit information indicates the value of "1", VCID is used as a DM-RS initial value so as to support localized transmission under the CoMP environment (e.g., CoMP scenario 4) of Rel-11, and information shown in Table 4 can be represented. In contrast, if the additional 1-bit information indicates the value of "0", the remaining states other than a specific state required for MU-MIMO related to Rel-11 may be allocated for the DPS scheme of the CoMP scheme. The following Table 6 shows an example of 3-bit information of DCI format 2C when the additional 1-bit information is set to "0".

TABLE 6

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID} = 0$, PCID | 0 | 2 layers, ports 7-8, $n_{SCID} = 0$, PCID |
| 1 | 1 layer, port 7, $n_{SCID} = 1$, PCID | 1 | 2 layers, ports 7-8, $n_{SCID} = 1$, PCID |
| 2 | 1 layer, port 8, $n_{SCID} = 0$, PCID | 2 | 2 layers, ports 7-8, $n_{SCID} = 0$, $VCID_1$ |
| 3 | 1 layer, port 8, $n_{SCID} = 1$, PCID | 3 | 2 layers, ports 7-8, $n_{SCID} = 1$, $VCID_1$ |
| 4 | 1 layer, port 7, $n_{SCID} = 0$, $VCID_1$ | 4 | 2 layers, ports 7-8, $n_{SCID} = 0$, $VCID_2$ |
| 5 | 1 layer, port 7, $n_{SCID} = 1$, $VCID_1$ | 5 | 2 layers, ports 7-8, $n_{SCID} = 1$, $VCID_2$ |
| 6 | 1 layer, port 8, $n_{SCID} = 0$, $VCID_1$ | 6 | . . . |
| 7 | 1 layer, port 8, $n_{SCID} = 1$, $VCID_1$ | 7 | . . . |

In Table 6, VCID1 and VCID2 refer to VCIDs required for the DPS scheme.

In another example, DCI bit information is added not only to SCID but also to 3-bit information indicating a spatial layer at the legacy DCI format 2C, such that the extended relationship of SCID and the spatial layer may be represented. In this case, the number of spatial layers supportable by PCID-based DM-RS may be different from the number of spatial layers supportable by VCID-based DM-RS. For example, assuming that 1-bit information is added to DCI format 2C such that a total of 4-bit information is utilized and the list of DM-RS sequence initial values is denoted by {PCID, VCID1, VCID2}, the relationship between SCID and the spatial layer is represented by the following Table 7.

TABLE 7

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID} = 0$, PCID | 0 | 2 layers, ports 7-8, $n_{SCID} = 0$, PCID |
| 1 | 1 layer, port 7, $n_{SCID} = 1$, PCID | 1 | 2 layers, ports 7-8, $n_{SCID} = 1$, PCID |
| 2 | 1 layer, port 8, $n_{SCID} = 0$, PCID | 2 | 3 layers, ports 7-9, PCID |
| 3 | 1 layer, port 8, $n_{SCID} = 1$, PCID | 3 | 4 layers, ports 7-10, PCID |
| 4 | 2 layers, ports 7-8, PCID | 4 | 5 layers, ports 7-11, PCID |
| 5 | 3 layers, ports 7-9, PCID | 5 | 6 layers, ports 7-12, PCID |
| 6 | 4 layers, ports 7-10, PCID | 6 | 7 layers, ports 7-13, PCID |
| 7 | 1 layer, port 7, $n_{SCID} = 0$, $VCID_1$ | 7 | 8 layers, ports 7-14, PCID |
| 8 | 1 layer, port 7, $n_{SCID} = 1$, $VCID_1$ | 8 | 2 layers, ports 7-8, $n_{SCID} = 0$, $VCID_1$ |
| 9 | 1 layer, port 8, $n_{SCID} = 0$, $VCID_1$ | 9 | 2 layers, ports 7-8, $n_{SCID} = 1$, $VCID_1$ |
| 10 | 1 layer, port 8, $n_{SCID} = 1$, $VCID_1$ | 10 | 3 layers, ports 7-9, $VCID_1$ |
| 11 | 2 layers, ports 7-8, $VCID_1$ | 11 | 4 layers, ports 7-10, $VCID_1$ |
| 12 | 1 layer, port 7, $n_{SCID} = 0$, $VCID_2$ | 12 | 2 layers, ports 7-8, $n_{SCID} = 0$, $VCID_2$ |
| 13 | 1 layer, port 7, $n_{SCID} = 1$, $VCID_2$ | 13 | 2 layers, ports 7-8, $n_{SCID} = 1$, $VCID_2$ |
| 14 | 1 layer, port 8, $n_{SCID} = 0$, $VCID_2$ | 14 | 3 layers, ports 7-9, $VCID_2$ |
| 15 | 2 layers, ports 7-8, $VCID_2$ | 15 | 4 layers, ports 7-10, $VCID_2$ |

In Table 7, whereas PCID can support a maximum of 8 spatial layers, each of $VCID_1$ and $VCID_2$ can support a maximum of 4 spatial layers. In this case, assuming that different DM-RS sequence initial values but not SCID are used, semi-orthogonal characteristics can be obtained and SCID utility is relatively decreased. Therefore, a fixed SCID value is utilized and many more VCID values (e.g., $VCID_1$, $VCID_2$, $VCID_3$, $VCID_4$, . . . ) are supported to substitute for the semi-orthogonal characteristics as shown in the following Table 8.

TABLE 8

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID} = 0$, PCID | 0 | 2 layers, ports 7-8, $n_{SCID} = 0$, PCID |
| 1 | 1 layer, port 8, $n_{SCID} = 1$, PCID | 1 | 3 layers, ports 7-9, PCID |
| 2 | 2 layers, ports 7-8, PCID | 2 | 4 layers, ports 7-10, PCID |
| 3 | 3 layers, ports 7-9, PCID | 3 | 5 layers, ports 7-11, PCID |
| 4 | 4 layers, ports 7-10, PCID | 4 | 6 layers, ports 7-12, PCID |
| 5 | 1 layer, port 7, $n_{SCID} = 0$, $VCID_1$ | 5 | 7 layers, ports 7-13, PCID |
| 6 | 1 layer, port 8, $n_{SCID} = 0$, $VCID_1$ | 6 | 8 layers, ports 7-14, PCID |
| 7 | 2 layers, ports 7-8, $VCID_1$ | 7 | 2 layers, ports 7-8, $n_{SCID} = 0$, $VCID_1$ |
| 8 | 1 layer, port 7, $n_{SCID} = 0$, $VCID_2$ | 8 | 3 layers, ports 7-9, $VCID_1$ |
| 9 | 1 layer, port 8, $n_{SCID} = 0$, $VCID_2$ | 9 | 3 layers, ports 7-10, $VCID_1$ |
| 10 | 2 layers, ports 7-8, $VCID_2$ | 10 | 2 layers, ports 7-8, $n_{SCID} = 0$, $VCID_2$ |
| 11 | 1 layer, port 7, $n_{SCID} = 0$, $VCID_3$ | 11 | 3 layers, ports 7-9, $VCID_2$ |
| 12 | 1 layer, port 8, $n_{SCID} = 0$, $VCID_3$ | 12 | 4 layers, ports 7-10, $VCID_2$ |
| 13 | 2 layers, ports 7-8, $VCID_3$ | 13 | 2 layers, ports 7-8, $n_{SCID} = 0$, $VCID_3$ |
| 14 | 1 layer, port 7, $n_{SCID} = 0$, $VCID_4$ | 14 | 3 layers, ports 7-9, $VCID_3$ |
| 15 | 1 layer, port 8, $n_{SCID} = 0$, $VCID_4$ | 15 | 4 layers, ports 7-10, $VCID_3$ |

In Table 8, PCID can support a maximum of 8 spatial layers, each of $VCID_1$, $VCID_2$, and $VCID_3$ can support a maximum of 4 spatial layers, and $VCID_4$ can support a maximum of one spatial layer. As can be seen from the above table showing the relationship between the extended SCID and the spatial layer, individual DM-RS sequence initial values may have different numbers of supportable spatial layers. In contrast, VCID-based higher rank transmission may be more beneficial at a transmission point (TP) where localized transmission of a specific CoMP environment (e.g., CoMP scenario 4) is needed. Unlike the above-mentioned example, the VCID-based higher rank transmission may support a maximum of 8 spatial layers at a specific VCID and may reduce the number of spatial layers supportable by PCID, as shown in the following Table 9.

TABLE 9

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID} = 0$, $VCID_1$ | 0 | 2 layers, ports 7-8, $n_{SCID} = 0$, $VCID_1$ |
| 1 | 1 layer, port 8, $n_{SCID} = 1$, $VCID_1$ | 1 | 3 layers, ports 7-9, $VCID_1$ |
| 2 | 2 layers, ports 7-8, $VCID_1$ | 2 | 4 layers, ports 7-10, $VCID_1$ |
| 3 | 3 layers, ports 7-9, $VCID_1$ | 3 | 5 layers, ports 7-11, $VCID_1$ |
| 4 | 4 layers, ports 7-10, $VCID_1$ | 4 | 6 layers, ports 7-12, $VCID_1$ |
| 5 | 1 layer, port 7, $n_{SCID} = 0$, PCID | 5 | 7 layers, ports 7-13, $VCID_1$ |
| 6 | 1 layer, port 8, $n_{SCID} = 0$, PCID | 6 | 8 layers, ports 7-14, $VCID_1$ |
| 7 | 2 layers, ports 7-8, PCID | 7 | 2 layers, ports 7-8, $n_{SCID} = 0$, PCID |
| 8 | 1 layer, port 7, $n_{SCID} = 0$, $VCID_2$ | 8 | 3 layers, ports 7-9, PCID |
| 9 | 1 layer, port 8, $n_{SCID} = 0$, $VCID_2$ | 9 | 3 layers, ports 7-10, PCID |
| 10 | 2 layers, ports 7-8, $VCID_2$ | 10 | 2 layers, ports 7-8, $n_{SCID} = 0$, $VCID_2$ |
| 11 | 1 layer, port 7, $n_{SCID} = 0$, $VCID_3$ | 11 | 3 layers, ports 7-9, $VCID_2$ |
| 12 | 1 layer, port 8, $n_{SCID} = 0$, $VCID_3$ | 12 | 4 layers, ports 7-10, $VCID_2$ |
| 13 | 2 layers, ports 7-8, $VCID_3$ | 13 | 2 layers, ports 7-8, $n_{SCID} = 0$, $VCID_3$ |
| 14 | 1 layer, port 7, $n_{SCID} = 0$, $VCID_4$ | 14 | 3 layers, ports 7-9, $VCID_3$ |
| 15 | 1 layer, port 8, $n_{SCID} = 0$, $VCID_4$ | 15 | 4 layers, ports 7-10, $VCID_3$ |

In this case, a higher layer signal or the like may establish that a specific UE will be operated on the basis of PCID shown in Table 8 or be operated on the basis of VCID shown in Table 9.

Fourth Embodiment

In accordance with the fourth embodiment of the present invention, when the list of DM-RS sequence initial values each of which is composed of PCID and VCID is UE-specifically transmitted, a method for reducing signal transmission load using the relationship between PCID and VCID is shown. The list of DM-RS sequence initial value candidates according to another embodiment of the present invention is UE-specifically transmitted, and can be transmitted through higher layer signaling such as RRC signaling. VCID is UE-specifically transmitted differently from a cell-common PCID. Thus, if VCID is composed of the same number of bits as the legacy PCID, the amount of load of a higher layer signal may be increased. Therefore, the embodiment of the present invention proposes a method for reducing signal transmission load using the relationship between PCID and VCID and the relationship between VCIDs.

After only bit information (e.g., log 2(2*k)) regarding a specific range (e.g., |PCID−VCID|≤k, VCID≠PCID) staring from the PCID is transmitted through higher layer signaling such as RRC signaling, the UE may recover VCID through PCID information detected through CRS or the like.

Another embodiment of the present invention proposes a method for reusing bit information of a DL control signal for selecting a DM-RS sequence initial value for other usages will hereinafter be described in detail. The UE may not prefer to use some operations such as DM-RS sequence dynamic assignment under a specific environment. For example, assuming that the eNB performs a DM-RS operation based on a fixed PCID in a subframe region of r-ABS (reduced power ABS), it is not necessary for the DCI bit information to be used for DM-RS sequence selection. In this case, the bit information may be used to indicate power allocation information for r-ABS.

Fifth Embodiment

The fifth embodiment proposes a method for assigning variance to a DM-RS sequence initial value using a search space (SS) will hereinafter be described in detail. When the LTE system performs the fall-back operation of TM 9 in the MBSFN subframe, it performs data transmission/reception for DCI format 1A. Under the environment of DCI format 1A, it is impossible to a variable DM-RS sequence initial value using SCID-related operations or additional DCI bit information. Therefore, the embodiment of the present invention proposes a method for establishing an SS-based DM-RS sequence initial value to support a variable DM-RS sequence initial value even under the above-mentioned environment.

For example, the UE having received the fall-back operation (i.e., DCI format 1A) at the MBSFN subframe obtains variance information corresponding to 1-bit information according to whether the UE has successfully performed searching in the CSS or USS region. For example, assuming two DM-RS sequence initial values {X1, X2} are established as higher layer signals, the UE selects X1 when successfully searching in the CSS region or selects X2 when successfully searching in the USS. In this case, an operation corresponding to one of the sequence initial values may be carried out in the overlap region of USS and CSS. In addition, a DM-RS sequence initial value may be selected according to a PDCCH candidate number or a CCE aggregation level.

Another embodiment of the present invention proposes a method for supporting SS-based non-CoMP and CoMP operations for DCI format 1A in TM 9. If DCI format 1A is received (or transmitted) in CSS of TM 9, CRS is used in the non-MBSFN subframe according to the legacy DCI format 1A, and PDSCH demodulation is performed using DM-RS at the MBSFN subframe. However, assuming that DCI format 1A is transmitted in USS of TM9, PDSCH demodulation is carried out using DM-RS irrespective of MBSFN subframe configuration of PDSCH TP. If DCI format 1A is transmitted in CSS and supports the conventional operation, a DM-RS sequence initial value transmitted at the MBSFN subframe may be based on PCID of the serving cell.

On the other hand, assuming that DCI format 1A is transmitted in USS and supports the CoMP operation, a DM-RS sequence initial value may be identical to one of VCIDs (e.g., x(0), x(1)) established for DCI format 2C, or may be set to a new VCID (e.g., x(2)) that can be established independently from the above VCIDs established for DCI format 2C. Alternatively, even in the case where DCI format 1A is transmitted in USS, PCID of the serving cell can be used without change. The following Table 10 briefly shows embodiments of the present invention.

TABLE 10

| | MBSFN subframe configuration | Type of DL RS | X value for DL RS sequence initialization |
|---|---|---|---|
| CSS(for non-CoMP) | non-MBSFN | CRS | PCID |
| | MBSFN | DM-RS | PCID |
| USS(for CoMP) | non-MBSFN | DM-RS | x(0) or x(1) or x(2) or PCID |
| | MBSFN | | |

In addition, assuming that DCI format 1A is transmitted to USS according to additional operations of the present invention, independent DM-RS sequence initial values may be established according to MBSFN configuration. That is, a DM-RS sequence initial value used when DCI format 1A is transmitted to USS and is set to the non-MBSFN subframe may be established independently from a DM-RS sequence initial value used when DCI format 1A is transmitted to USS and is set to the MBSFN subframe.

Sixth Embodiment

The sixth embodiment of the present invention proposes a method for employing information dependent upon legacy DL control information for specific usages, and applying independent information to legacy DL control signals for other usages. Assuming that a DM-RS sequence initial value is coupled to SCID dependent upon the legacy DL control signal as shown in {X1, SCID=0} or {X2, SCID=1} in the LTE system, X2 can support a maximum of 2 spatial layers whereas X1 can support a maximum of 8 spatial layers. In other words, assuming that independent bit information is added to the legacy DL control signal, there is no limitation in conventional data transmission without increasing signal transmission load, such that simple extension is more beneficial. The embodiment of the present invention proposes a method for utilizing independent information and dependent information according to individual usages.

For example, assuming that the LTE system uses SCID and additional DCI N-bit information, a total of $2^{N+1}$ options may occur. The following Table 11 shows DM-RS sequence initial values capable of being selected at N=1.

TABLE 11

| SCID = 1 | X1 | X2 |
| SCID = 0 (1 ≤ rank ≤ 8) | X3 | X4 |
| Additional bit(s) | 0 | 1 |

In Table 11, X1 or X2 capable of being represented by SCID=1 can generate a DM-RS supporting a maximum of 2 spatial layers, such that X1 and X2 can be used for MU-MIMO operations supported by a small number of spatial layers. In this case, SCID=1 and additional 1-bit information may provide two DM-RS sequences supporting the MU-MIMO operation. For example, SCID=1 and additional 1-bit information may be used for scheduling with Rel-10 UEs or scheduling with UEs of a TP having a different VCID. In contrast, X3 or X4 capable of being represented by SCID=0 can generate a DM-RS sequence supporting a maximum of 8 spatial layers, such that X3 and X4 can be used to extend the legacy data transmission scheme such as the DPS scheme without limitation. As described above, while dependent information (e.g., SCID) is used to represent the limited transmission scheme (e.g., MU-MIMO), independent information (e.g., additional DCI bits) may be used to extend the legacy transmission scheme.

Another embodiment of the present invention proposes a method for generating a DM-RS sequence capable of utilizing some parts of the spatial layers from multiple TPs, and a method for indicating DL control information related to the DM-RS sequence generation. When the LTE system according to one embodiment of the present invention operates the CoMP scheme, the LTE system can transmit data by allocating some spatial layers to two TPs according to one example of the JT scheme. For example, UE1, that can support a maximum of 4 spatial layers under the condition that two TPs (TP1, TP2) are present, may receive two spatial layers through antenna ports #7 and #8 at TP1, and may receive two spatial layers through antenna ports #9 and #10 at TP2. In the above-mentioned example, the DM-RS for the antenna ports #7 and #8 and the DM-RS for the antenna ports #9 and #10 may be generated on the basis of different initial values. In order to inform the UE of a specific case in which different DM-RS initial values are assigned to individual antenna ports, after new bit information is added to DCI, the added result may be coupled to the legacy DL control information. According to a method for representing a DM-RS sequence initial value as shown in the following Table 12, when two DM-RS sequence initial values {PCID, VCID1} are established through higher layer signaling, DCI 1-bit information is added to SCID and 3-bit information indicating a spatial layer in the legacy DCI format 2C, such that spatial layers of individual antenna ports can start from different TPs.

TABLE 12

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID}$ = 0, PCID | 0 | 2 layers, ports 7-8, $n_{SCID}$ = 0, PCID |
| 1 | 1 layer, port 7, $n_{SCID}$ = 1, PCID | 1 | 2 layers, ports 7-8, $n_{SCID}$ = 1, PCID |
| 2 | 1 layer, port 8, $n_{SCID}$ = 0, PCID | 2 | 3 layers, ports 7-9, PCID |
| 3 | 1 layer, port 8, $n_{SCID}$ = 1, PCID | 3 | 4 layers, ports 7-10, PCID |
| 4 | 2 layers, ports 7-8, PCID | 4 | 5 layers, ports 7-11, PCID |
| 5 | 3 layers, ports 7-9, PCID | 5 | 6 layers, ports 7-12, PCID |
| 6 | 4 layers, ports 7-10, PCID | 6 | 7 layers, ports 7-13, PCID |
| 7 | 1 layer, port 7, $n_{SCID}$ = 0, $VCID_1$ | 7 | 8 layers, ports 7-14, PCID |
| 8 | 1 layer, port 7, $n_{SCID}$ = 1, $VCID_1$ | 8 | 2 layers, ports 7-8, $n_{SCID}$ = 0, $VCID_1$ |
| 9 | 1 layer, port 8, $n_{SCID}$ = 0, $VCID_1$ | 9 | 2 layers, ports 7-8, $n_{SCID}$ = 1, $VCID_1$ |
| 10 | 1 layer, port 8, $n_{SCID}$ = 1, $VCID_1$ | 10 | 4 layers, ports 7-8 (PCID), ports 9-10 ($VCID_1$) |
| 11 | 2 layers, ports 7-8, $VCID_1$ | 11 | 4 layers, ports 7-8 ($VCID_1$), ports 9-10 (PCID) |
| 12 | 3 layers, ports 7-9, $VCID_1$ | 12 | 6 layers, ports 7, 8, 11 (PCID), ports 9, 10, 12 ($VCID_1$) |
| 13 | 4 layers, ports 7-10, $VCID_1$ | 13 | 6 layers, ports 7, 8, 11 ($VCID_1$), ports 9, 10, 12 (PCID) |
| 14 | Reserved | 14 | 8 layers, ports 7, 8, 11, 13 (PCID), ports 9, 10, 12, 14 ($VCID_1$) |

TABLE 12-continued

| One Codeword: Codeword 0 enabled, Codeword 1 disabled | | Two Codewords: Codeword 0 enabled, Codeword 1 enabled | |
|---|---|---|---|
| Value | Message | Value | Message |
| 15 | Reserved | 15 | 8 layers, ports 7, 8, 11, 13 (VCID$_1$), ports 9, 10, 12, 14 (PCID) |

Table 12 may be extended to limit the spatial layer as well as to include many more VCIDs. For example, assuming that only two spatial layers can be allocated from each TP, Table 12 may be designed to support many more VCIDs (e.g., VCID$_1$, VCID$_2$, VCID$_3$).

TABLE 13

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID} = 0$, PCID | 0 | 2 layers, ports 7-8, $n_{SCID} = 0$, PCID |
| 1 | 1 layer, port 7, $n_{SCID} = 1$, PCID | 1 | 2 layers, ports 7-8, $n_{SCID} = 1$, PCID |
| 2 | 1 layer, port 8, $n_{SCID} = 0$, PCID | 2 | 3 layers, ports 7-9, PCID |
| 3 | 1 layer, port 8, $n_{SCID} = 1$, PCID | 3 | 4 layers, ports 7-10, PCID |
| 4 | 2 layers, ports 7-8, PCID | 4 | 5 layers, ports 7-11, PCID |
| 5 | 3 layers, ports 7-9, PCID | 5 | 6 layers, ports 7-12, PCID |
| 6 | 4 layers, ports 7-10, PCID | 6 | 7 layers, ports 7-13, PCID |
| 7 | 1 layer, port 7, $n_{SCID} = 0$, VCID$_1$ | 7 | 8 layers, ports 7-14, PCID |
| 8 | 1 layer, port 7, $n_{SCID} = 1$, VCID$_1$ | 8 | 2 layers, ports 7-8, $n_{SCID} = 0$, VCID$_1$ |
| 9 | 1 layer, port 8, $n_{SCID} = 0$, VCID$_1$ | 9 | 2 layers, ports 7-8, $n_{SCID} = 1$, VCID$_1$ |
| 10 | 1 layer, port 8, $n_{SCID} = 1$, VCID$_1$ | 10 | 4 layers, ports 7-8 (PCID), ports 9-10 (VCID$_1$) |
| 11 | 2 layers, ports 7-8, VCID$_1$ | 11 | 4 layers, ports 7-8 (VCID$_1$), ports 9-10 (PCID) |
| 12 | 2 layers, ports 7-8, VCID$_2$ | 12 | 4 layers, ports 7-8 (PCID), ports 9-10 (VCID$_1$) |
| 13 | 2 layers, ports 7-8, VCID$_3$ | 13 | 4 layers, ports 7-8 (VCID$_2$), ports 9-10 (PCID) |
| 14 | Reserved | 14 | 4 layers, ports 7-8 (PCID), ports 9-10 (VCID$_3$) |
| 15 | Reserved | 15 | 4 layers, ports 7-8 (VCID$_3$), ports 9-10 (PCID) |

Alternatively, the embodiment of the present invention may support a method for supporting the operation for partially the spatial layer starting from a plurality of TPs using only added DCI information without relating to the legacy DL control information. Assuming that a UE supports 4 spatial layers under the environment in which TP1 has PCID and TP2 has VCID, if the UE obtains the value of 0 by addition of 1-bit DCI information, it receives all the four spatial layers from TP1 and generates a PCID-based DM-RS. In contrast, if a UE obtains the value of 1, the UE receives two spatial layers from TP1 and generates a DM-RS of the corresponding antenna port (e.g., antenna port #7 or #8) on the basis of PCID, receives the remaining two spatial layers from TP2, and generates a DM-RS of the corresponding antenna port (e.g., antenna port #9 or #10) on the basis of VCID. In the above-mentioned operations of the present invention, antenna ports being CDM-processed in the same resource element (RE) set have the same scrambling sequences. In the case in which there is a difference in scrambling sequence between antenna ports, this means that CDM groups are different from each other.

Figure 10:
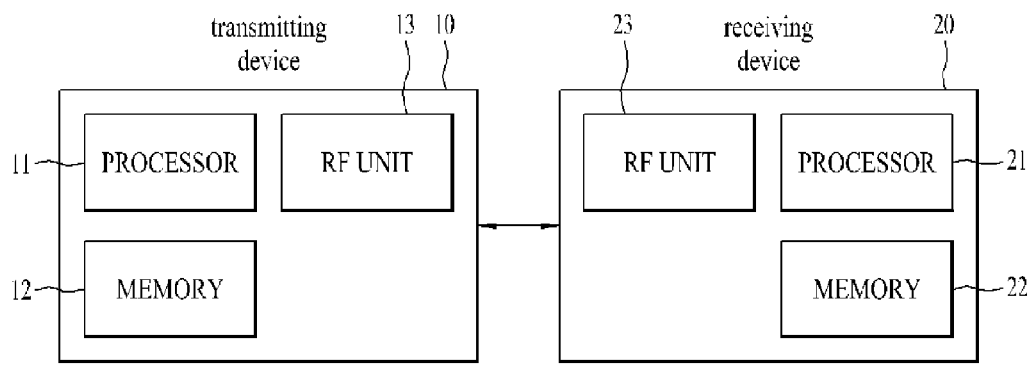
FIG. 10 is a block diagram illustrating an apparatus applicable to embodiment(s) of the present invention.

FIG. 10 is a block diagram of a transmitting device 10 and a receiving device 20 configured to implement exemplary embodiments of the present invention.

Referring to FIG. 10, a transmitting device 10 and a receiving device 20 respectively include Radio Frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and controlling the processors 11 and 21 and may temporarily storing input/output information. The memories 12 and 22 may be used as buffers.

The processors 11 and 21 control the overall operation of various modules in the transmitting device 10 or the receiving device 20. The processors 11 and 21 may perform various control functions to perform the present invention. The processors 11 and 21 may be called controllers, microcontrollers, microprocessors, or micro-computers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the exterior. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a Medium Access Control (MAC) layer. One Transport Block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under the control of the processor 21, the RF unit 23 of the receiving device 10 receives RF signals transmitted by the transmitting device 10. The RF unit 23 may include Nr (where Nr is a positive integer) receive antennas and frequency down-converts each signal received through receive antennas into a baseband signal. The RF unit 23 may include an oscillator for frequency down-conversion. The processor 21 decodes and demodulates the radio signals received through the receive antennas and restores data that the transmitting device 10 originally desired to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the receiving device 20. A Reference Signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

In embodiments of the present invention, a UE serves as the transmission device 10 on an uplink and as the receiving device 20 on a downlink. In embodiments of the present invention, an eNB or BS serves as the receiving device 20 on an uplink and as the transmission device 10 on a downlink.

The transmitting device and/or the receiving device may be configured to a combination of one or more embodiments shown in FIGS. 7 to 10.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

INDUSTRIAL APPLICABILITY

The method and apparatus for transmitting and receiving downlink signals according to embodiments of the present invention can be applied to a UE, a BS (eNB), or other communication devices in a wireless communication system.

The invention claimed is:

1. A method for receiving a downlink signal by a user equipment (UE) in a wireless communication system supporting Coordinated Multi-point transmission and reception (CoMP), the method comprising:
receiving a list of candidate seeds for generating a sequence of a downlink demodulation reference signal (DM-RS), the list of candidate seeds including at least one physical cell identity (PCID) and at least two virtual cell ID (VCID);
receiving a subset of the list of candidate seeds, the subset including two cell IDs among the at least one PCID and the at least two VCID;
selecting one cell ID among the two cell IDs included in the subset of the list of candidate seeds; and
generating the sequence of the downlink DM-RS using the selected one cell ID.

2. The method according to claim 1, further comprising:
receiving and detecting downlink control information (DCI),
wherein the one cell ID is differently selected according to a value of a specific bit included in the DCI.

3. The method according to claim 1, further comprising:
receiving and detecting downlink control information (DCI),
wherein the one cell ID is differently selected according to whether the DCI is detected in a common search space (CSS) region or a UE-specific search space (USS) region.

4. The method according to claim 1, further comprising:
receiving and detecting downlink control information (DCI),
wherein the one cell ID is differently selected according to a control channel element (CCE) aggregation level.

5. The method according to claim 1, wherein the subset of the list of the candidate seeds is differently established according to indexes of a downlink subframe.

6. The method according to claim 1, wherein:
the subset of the list of the candidate seeds is differently established according to an identifier of a hybrid automatic repeat request (HARQ) process.

7. The method according to claim 1, further comprising:
receiving and detecting downlink control information (DCI),
wherein, if a format of the detected DCI corresponds to a unique operation of a transmission mode configured to the UE, the selected one cell ID is a VCID, and
wherein, if a format of the detected DCI corresponds to a fall-back operation of the transmission mode, the selected one cell ID is a PCID.

8. A method for transmitting a downlink signal by a base station (BS) in a wireless communication system supporting Coordinated Multi-point transmission and reception (CoMP), the method comprising:
transmitting a list of candidate seeds for generating a sequence of a downlink demodulation reference signal (DM-RS) to a user equipment (UE), the list of candidate seeds including at least one physical cell identity (PCID) and at least two virtual cell ID (VCID);
transmitting a subset of the list of candidate seeds, the subset including two cell IDs among the at least one PCID and the at least two VCID to the UE;
wherein the UE is configured to select one cell ID among the two cell IDs included in the subset of the list of candidate seeds, and
generating the sequence of the downlink DM-RS using the selected one cell ID.

9. A user equipment (UE) for receiving a downlink signal (UE) in a wireless communication system supporting Coordinated Multi-point transmission and reception (CoMP) comprising:
a radio frequency (RF) unit; and
a processor configured to control the RF unit,
wherein the processor is configured to
receive a list of candidate seeds for generating a sequence of a downlink demodulation reference signal (DM-RS),
wherein the list of candidate seeds includes at least one physical cell identity (PCID) and at least two virtual cell ID (VCID), receive a subset of the list of candidate seeds, the subset including two cell IDs among the at least one PCID and the at least two VCID, select one cell ID among the two cell IDs included in the subset of the list of candidate seeds, and generate the sequence of the downlink DM-RS using the selected one cell ID.

10. The user equipment (UE) according to claim 9, wherein the processor is further configured to receive and detect downlink control information (DCI), and wherein the one cell ID is differently selected according to a value of a specific bit included in the DCI.

11. The user equipment (UE) according to claim 9, wherein the processor is further configured to receive and detect downlink control information (DCI), and wherein the one cell ID is differently selected according to whether the DCI is detected in a common search space (CSS) region or a UE-specific search space (USS) region.

12. The user equipment (UE) according to claim 9, wherein the processor is further configured to receive and detect downlink control information (DCI), and wherein the one cell ID is differently selected according to a control channel element (CCE) aggregation level.

13. The user equipment (UE) according to claim 9, wherein the subset of the list of the candidate seeds is differently established according to indexes of a downlink subframe.

14. The user equipment (UE) according to claim 9, wherein:

the subset of the list of the candidate seeds is differently established according to an identifier of a hybrid automatic repeat request (HARQ) process.

15. The user equipment (UE) according to claim 9, wherein the processor is further configured to receive and detect downlink control information (DCI), wherein if a format of the detected DCI corresponds to a unique operation of a transmission mode configured to the UE, the selected one cell ID is a VCID, and wherein if a format of the detected DCI corresponds to a fall-back operation of the transmission mode, the selected one cell ID is a PCID.

16. A base station (BS) for transmitting a downlink signal in a wireless communication system supporting Coordinated Multi-point transmission and reception (CoMP) comprising:

a radio frequency (RF) unit; and a processor configured to control the RF unit, wherein the processor is configured to transmit a list of candidate seeds for generating a sequence of a downlink demodulation reference signal (DM-RS) to a user equipment (UE), the list of candidate seeds including at least one physical cell identity (PCID) and at least two virtual cell ID (VCID), transmit a subset of the list of candidate seeds, the subset including two cell IDs among the at least one PCID and the at least two VCID to the UE, wherein the UE is configured to select one cell ID among the two cell IDs included in the subset of the list of candidate seeds, and generate the sequence of the downlink DM-RS using the selected one cell ID.

* * * * *